United States Patent
Lee et al.

(10) Patent No.: US 10,127,051 B2
(45) Date of Patent: Nov. 13, 2018

(54) MULTI-PROCESSOR DEVICE

(71) Applicant: Samsung Electronics Co., Ltd., Gyeonggi-do (KR)

(72) Inventors: Woo-Cheol Lee, Gyeonggi-do (KR); Jin-Woo Roh, Gyeonggi-do (KR); Moo-Young Kim, Seoul (KR); Dong-Wook Suh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/934,419

(22) Filed: Nov. 6, 2015

(65) Prior Publication Data

US 2016/0132369 A1    May 12, 2016

(30) Foreign Application Priority Data

Nov. 7, 2014   (KR) .................... 10-2014-0154392

(51) Int. Cl.
*G06F 9/4401*   (2018.01)
*G06F 1/32*     (2006.01)
(Continued)

(52) U.S. Cl.
CPC .......... *G06F 9/4408* (2013.01); *G06F 1/3296* (2013.01); *G06F 9/5094* (2013.01); *G06F 9/4401* (2013.01); *H04W 52/0229* (2013.01); *H04W 52/0293* (2013.01); *Y02D 10/22* (2018.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01);
(Continued)

(58) Field of Classification Search
CPC ............................. G06F 1/3296; G06F 9/4408
USPC ............................................................ 713/2
See application file for complete search history.

(56) References Cited

U.S. PATENT DOCUMENTS

| | | | | |
|---|---|---|---|---|
| 6,240,521 B1* | 5/2001 | Barber | .................. | G06F 1/3203 713/323 |
| 7,450,963 B2* | 11/2008 | Krishnan | .............. | G06F 1/3203 455/343.1 |

(Continued)

FOREIGN PATENT DOCUMENTS

| | | |
|---|---|---|
| EP | 2 683 204 A1 | 1/2014 |
| GB | 2491666 A | 12/2012 |

(Continued)

OTHER PUBLICATIONS

Frenzel; "The Fundamentals of Short-Range Wireless Technology"; Oct. 11, 2012; http://electronicdesign.com/communications/fundamentals-short-range-wireless-technology.

(Continued)

*Primary Examiner* — Jaweed A Abbaszadeh
*Assistant Examiner* — Volvick Derose
(74) *Attorney, Agent, or Firm* — Cha & Reiter, LLC

(57) ABSTRACT

An electronic device includes a first processor; and a second processor; and a third processor. The second processor is configured to detect an event, select one of the first and third processors to perform one or more operations associated with the event, and cause the selected processor to perform the one or more operations.

18 Claims, 12 Drawing Sheets

(51) Int. Cl.
*G06F 9/50* (2006.01)
*H04W 52/02* (2009.01)

(52) U.S. Cl.
CPC .......... *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 7,602,742 B1* | 10/2009 | Skinner | H04W 48/16 370/311 |
| 8,504,121 B1* | 8/2013 | Pan | H04W 52/028 455/127.5 |
| 2001/0049744 A1* | 12/2001 | Hussey | G06F 9/30043 709/238 |
| 2003/0067930 A1* | 4/2003 | Salapura | H04L 47/10 370/412 |
| 2003/0177343 A1* | 9/2003 | Magoshi | G06F 9/325 712/241 |
| 2003/0187914 A1* | 10/2003 | Kaniyar | H04L 67/1002 709/201 |
| 2005/0132239 A1* | 6/2005 | Athas | G06F 1/3203 713/300 |
| 2007/0079161 A1* | 4/2007 | Gupta | G06F 1/3203 713/324 |
| 2007/0124610 A1* | 5/2007 | Ho | G06F 1/3203 713/300 |
| 2007/0136536 A1 | 6/2007 | Byun et al. | |
| 2007/0140199 A1* | 6/2007 | Zhao | H04W 52/0229 370/338 |
| 2007/0180223 A1* | 8/2007 | Tanaka | G06F 15/177 713/2 |
| 2007/0192529 A1 | 8/2007 | Roh et al. | |
| 2007/0198134 A1* | 8/2007 | Adachi | G06F 1/206 700/300 |
| 2007/0300227 A1* | 12/2007 | Mall | G06F 9/3851 718/102 |
| 2008/0052504 A1* | 2/2008 | Tsuji | G06F 9/4418 713/1 |
| 2008/0127192 A1* | 5/2008 | Capps | G06F 1/3203 718/103 |
| 2008/0162964 A1* | 7/2008 | Dahlen | G06F 1/3203 713/320 |
| 2009/0217069 A1* | 8/2009 | Chen | G06F 1/3203 713/322 |
| 2009/0228890 A1 | 9/2009 | Vaitovirta et al. | |
| 2009/0313492 A1* | 12/2009 | Lerman | G06F 1/3203 713/323 |
| 2011/0113219 A1* | 5/2011 | Golshan | G06F 9/44505 712/30 |
| 2011/0138388 A1* | 6/2011 | Wells | G06F 1/3203 718/100 |
| 2011/0149971 A1* | 6/2011 | Zhu | H04L 47/10 370/392 |
| 2011/0289332 A1* | 11/2011 | Bondalapati | G06F 1/3228 713/323 |
| 2011/0320668 A1* | 12/2011 | Liu | H04L 12/2898 710/301 |
| 2012/0100895 A1* | 4/2012 | Priyantha | H04W 52/0293 455/574 |
| 2012/0185726 A1* | 7/2012 | Duron | G06F 11/2028 714/11 |
| 2012/0198207 A1* | 8/2012 | George | G06F 1/3206 712/36 |
| 2012/0227040 A1* | 9/2012 | Gounares | G06F 9/45558 718/1 |
| 2012/0317429 A1* | 12/2012 | Chang | G06F 1/3293 713/320 |
| 2013/0151840 A1* | 6/2013 | Kanigicherla | G06F 9/461 713/100 |
| 2013/0159755 A1* | 6/2013 | Presant | G06F 1/206 713/340 |
| 2013/0232538 A1* | 9/2013 | Johnson | G06F 1/3293 725/151 |
| 2013/0262902 A1* | 10/2013 | Herdrich | G06F 9/5094 713/323 |
| 2013/0339712 A1* | 12/2013 | Bruckert | G06F 9/5027 713/2 |
| 2014/0075226 A1* | 3/2014 | Heo | G06F 1/3234 713/323 |
| 2014/0094198 A1* | 4/2014 | Heo | H04W 52/028 455/456.4 |
| 2014/0126577 A1* | 5/2014 | Post | G06F 9/5027 370/400 |
| 2014/0181501 A1* | 6/2014 | Hicok | G06F 9/5094 713/100 |
| 2014/0191991 A1* | 7/2014 | Flowers | G06F 1/3215 345/173 |
| 2014/0196050 A1* | 7/2014 | Yu | G06F 9/5088 718/104 |
| 2015/0187339 A1* | 7/2015 | Vaz Waddington | G09G 5/393 345/563 |
| 2015/0234450 A1* | 8/2015 | Lin | G06F 1/3293 713/323 |
| 2015/0277988 A1* | 10/2015 | Watanabe | G06F 1/3203 718/104 |
| 2015/0346799 A1* | 12/2015 | Sengupta | G06F 1/3206 713/320 |
| 2016/0379017 A1* | 12/2016 | Wang | G06Q 20/3552 235/441 |

FOREIGN PATENT DOCUMENTS

| | | |
|---|---|---|
| JP | 2006-323761 A | 11/2006 |
| JP | 2007-206885 A | 8/2007 |
| KR | 10-2009-0034225 A | 4/2009 |
| WO | 2009/124911 A1 | 10/2009 |

OTHER PUBLICATIONS

European Search Report, dated Mar. 18, 2016.
Balasubramanian; et al.; "Efficiently Running Continuous Monitoring Applications on Mobile Devices using Sensor Hubs"; Nov. 2, 2013; XP055278563.
"Functional Block Diagram for CC3000"; Jun. 8, 2016; XP055278991.
European Search Report, dated Jun. 21, 2016.
European Search Report dated Jun. 14, 2018.

* cited by examiner

MULTI-PROCESSOR DEVICE

CLAIM OF PRIORITY

This application claims the benefit of priority under 35 U.S.C. § 119(a) from a Korean patent application filed in the Korean Intellectual Property Office on Nov. 7, 2014 and assigned Ser. No. 10-2014-0154392, the entire disclosure of which is incorporated herein by reference.

BACKGROUND

Field of the Disclosure

The present disclosure relates to electronic devices, in general, and more particularly to a multi-processor device.

Description of the Related Art

An electronic device may include a plurality of processors, and the plurality of processors may be used to process one or more tasks in order to perform the function of the electronic device. The electronic device may include a main processing module and a sub-processing module. The main processing module may include a processor for controlling the overall operation or function of the electronic device such as, for example, an application processor (AP). The sub-processing module may include a dedicated processor that is configured to perform a specific function in order to support the operation or function of the main processing module. The sub-processing module may include a sensor-dedicated processor for sensing external environmental information, such as a sensor hub for example.

According to the related art, in order to reduce the power consumption, the electronic device may supply the power only to the currently activated processor among a plurality of processors and to the function blocks connected to the processor. However, since a short-range communication module such as Bluetooth is connected to the main processing module among a plurality of processors, a short-range communication module-related application may be run if the main processing module is activated, to which the short-range communication module is connected. The main processing module may be activated on a limited basis due to its relatively high power consumption, so the short-range communication module may be restrictively operated. In addition, in a case where the short-range communication module is driven by another processing module (e.g., a sub-processing module), not by the main processing module, synchronization issues between the main processing module and the sub-processing module may occur. Further, in a case where a connection circuit (e.g., a switch) for selectively connecting the short-range communication module to the main processing module and the sub-processing module is added, it is difficult to implement a seamless connection, and the mounting area and the material cost may increase due to the addition of the switch.

The above information is presented as background information only to assist with an understanding of the present disclosure. No determination has been made, and no assertion is made, as to whether any of the above might be applicable as prior art with regard to the present disclosure.

SUMMARY

According to aspects of the disclosure, an electronic device is provided comprising: a first processor; and a second processor; and a third processor, wherein the second processor is configured to detect an event, select one of the first and third processors to perform one or more operations associated with the event, and cause the selected processor to perform the one or more operations.

According to aspects of the disclosure method is provided for operating an electronic device having a first processor, a second processor, and a third processor, the method comprising: detecting an event; detecting, by the second processor, whether to perform one or more operations associated with the event; selecting, by the second processor, one of the first processor and the third processor to perform the one or more operations; and causing, by the second processor, the selected processor to perform the one or more operations.

According to aspects of the disclosure, a non-transitory computer readable medium is provided storing-processor executable instructions which when executed by the by an electronic device having a first processor, a second processor, and third processor, cause the electronic device to execute a method comprising: detecting an event; detecting, by the second processor, whether to perform one or more operations associated with the event; selecting, by the second processor, one of the first processor and the third processor to perform the one or more operations; and causing, by the second processor, the selected processor to perform the one or more operations.

BRIEF DESCRIPTION OF THE DRAWINGS

The above and other aspects, features and advantages of certain exemplary embodiments of the present disclosure will be more apparent from the following description taken in conjunction with the accompanying drawings, in which.

DETAILED DESCRIPTION

Figure 1:
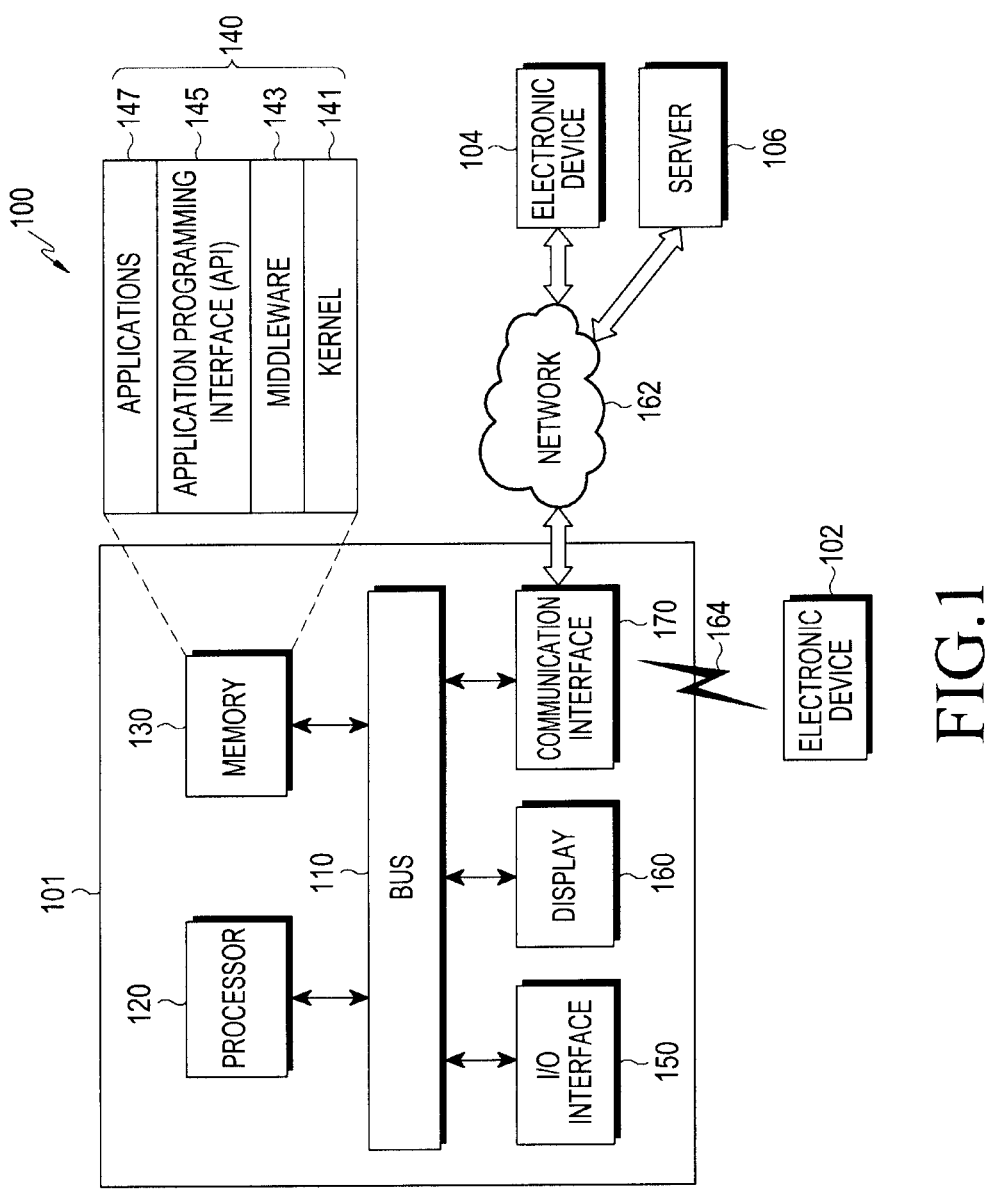
FIG. 1 is a diagram of an example of a network environment, according to various embodiments of the present disclosure.

Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head-mounted-device (HMD), electronic clothing, an electronic bracelet, an electronic necklace, an electronic App accessory (or appcessory), electronic tattoo, a smart mirror, or a smart watch.).

In some embodiments, the electronic device may be a smart home appliance. The smart home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global positioning system (GPS) receiver, an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller's machine (ATM) for banks, point of sales (POS) for shops, or an internet of things (IoT) device (e.g., an electronic bulb, various sensors, an electricity or gas meter, a sprinkler device, a fire alarm, a thermostat, a streetlamp, a toaster, fitness equipment, a hot-water tank, a heater, a boiler or the like).

In some embodiments, the electronic device may include at least one of a part of the furniture or building/structure, an electronic board, an electronic signature receiving device, a projector, or various meters (e.g., meters for water, electricity, gas or radio waves). In various embodiments, the electronic device may be one or a combination of the above-described devices. An electronic device according to some embodiments may be a flexible electronic device. An electronic device according to an embodiment of the present disclosure will not be limited to the above-described devices, and may include a new electronic device that is provided by the development of technology.

Now, an electronic device according to various embodiments of the present disclosure will be described with reference to the accompanying drawings. As used herein, the term 'user' may refer to a person who uses the electronic device, or a device (e.g., an intelligent electronic device) that uses the electronic device.

FIG. 1 is a diagram of an example of a network environment, according to various embodiments of the present disclosure.

Referring to FIG. 1, an electronic device 101 in a network environment 100 in various embodiments will be described. The electronic device 101 may include a bus 110, a processor 120, a memory 130, an input/output (I/O) interface 150, a display 160, and a communication interface 170. In some embodiments, the electronic device 101 may exclude at least one of the above components, or may further include other components.

The bus 110 may include, for example, a circuit that connects the components 110 to 170 to each other, and transfers the communication (e.g., a control message and/or data) between the components 110 to 170.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may execute, for example, a control and/or communication-related operation or data processing for at least one other component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may include a volatile and/or non-volatile memory. The memory 130 may store, for example, a command or data related to at least one other component of the electronic device 101. In one embodiment, the memory 130 may store software and/or a program 140. The program 140 may include, for example, a kernel 141, a middleware 143, an application programming interface (API) 145, and/or an application program (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, with respect to the work requests received from the application program(s) 147, the middleware 143 may, for example, perform control (e.g., scheduling or load balancing) for the work requests by using a method of assigning a priority capable of using the system resources (e.g., the bus 110, the processor 120, the memory 130 or the like) of the electronic device 101 to any one of the application programs 147.

The API 145 is, for example, an interface by which the application 147 controls the function provided in the kernel 141 or the middleware 143, and may include at least one interface or function (e.g., a command) for, for example, file control, window control, image processing or character control.

The I/O interface 150 may, for example, serve as an interface that can transfer a command or data received from the user or another external device to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a micro-electromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body.

The communication interface 170 may, for example, establish communication between the electronic device 101 and an external electronic device (e.g., a first external electronic device 102, a second external electronic device 104 or a server 106). For example, the communication interface 170 may communicate with the external electronic device (e.g., the second external electronic device 104 or the server 106) by being connected to a network 162 by wireless communication or wired communication.

The wireless communication may include at least one of, for example, long-term evolution (LTE), long-term evolution-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet or the telephone network.

Each of the first and second external electronic devices 102 and 104 may be a device that is the same as or different from the electronic device 101. In one embodiment, the server 106 may include a group of one or more servers. In various embodiments, all or some of the operations executed by the electronic device 101 may be executed by one or multiple other electronic devices (e.g., the electronic devices 102 and 104 or the server 106). In one embodiment, if the electronic device 101 should perform a certain function or service automatically or upon request, the electronic device 101 may request at least some of the functions related thereto from other electronic devices (e.g., the electronic devices 102 and 104 or the server 106), instead of or in addition to spontaneously executing the function or service. The other electronic devices (e.g., the electronic devices 102 and 104 or the server 106) may execute the requested function or additional function, and provide the results to the electronic device 101. The electronic device 101 may process the received results intact or additionally, thereby providing the requested function or service. To this end, for example, the cloud computing, distributed computing, or client-server computing technology may be used.

Figure 2:
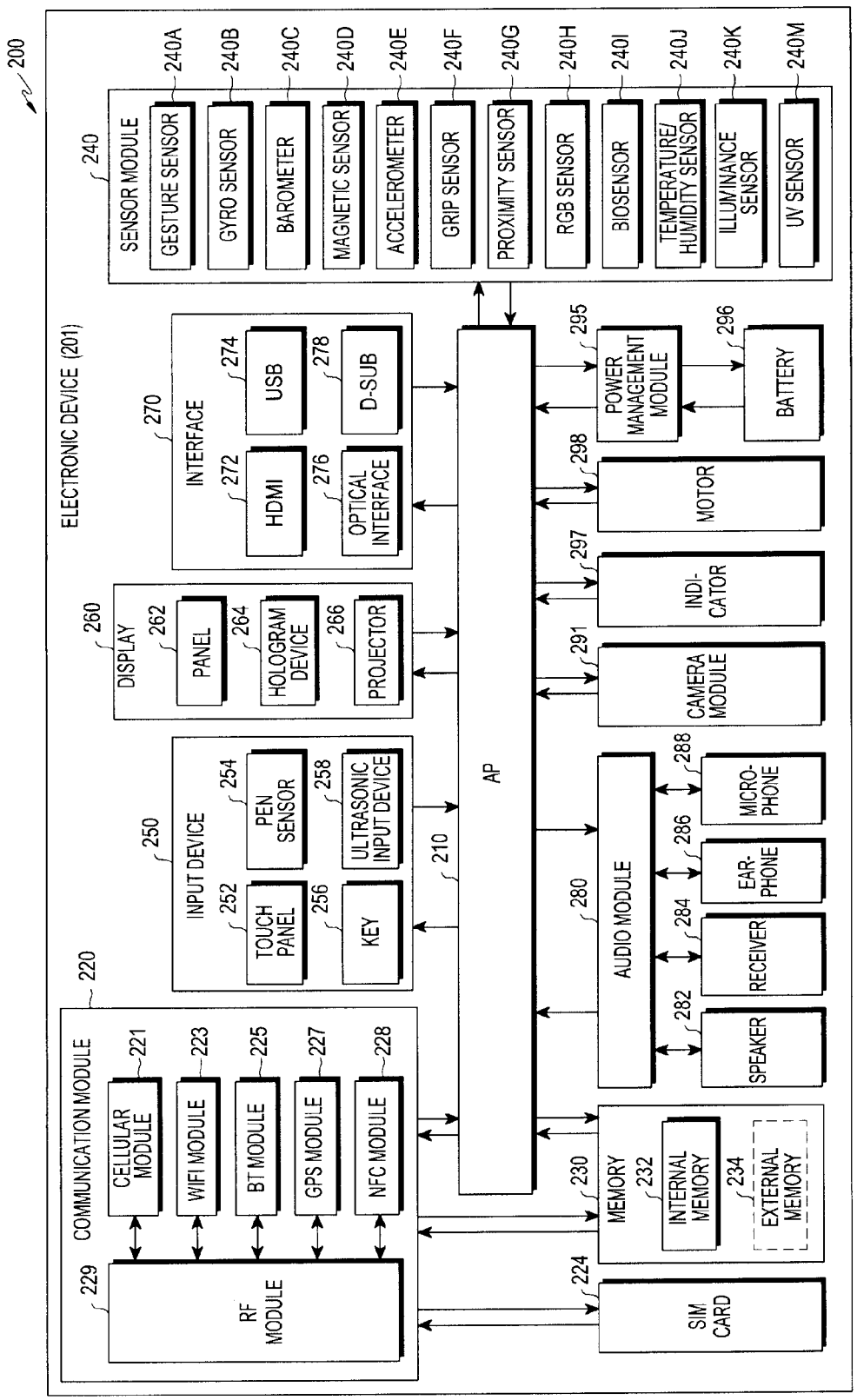
FIG. 2 is a block diagram of an example of an electronic device, according to various embodiments of the present disclosure.

FIG. 2 illustrates a block diagram 200 of an electronic device 201 according to various embodiments of the present disclosure. The electronic device 201 may include, for example, all or some of the components of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210, for example, may control a plurality of hardware or software components connected to the AP 210 by running the operating system or application program, and may process and calculate a variety of data. The AP 210 may be implemented as, for example, a system on a chip. In one embodiment, the AP 210 may further include a graphic processing unit (GPU) and/or an image signal processor. The AP 210 may include at least some (e.g., a cellular module 221) of the components shown in FIG. 2. The AP 210 may load, in volatile memory, a command or data received from at least one of other components (e.g., non-volatile memory) and process the loaded data, and may store a variety of data in a non-volatile memory.

The communication module 220 may have a structure which is the same as or similar to that of the communication interface 170 in FIG. 1. The communication module 220 may include, for example, the cellular module 221, a wireless fidelity (WiFi) module 223, a Bluetooth (BT) module 225, a GPS module 227, a near-field communication (NFC) module 228, and a radio frequency (RF) module 229.

The cellular module 221 may provide, for example, a voice call service, a video call service, a messaging service or an Internet service over the communication network. In one embodiment, the cellular module 221 may identify and authenticate the electronic device 201 within the communication network using a subscriber identification module (e.g., the SIM card 224). In one embodiment, the cellular module 221 may have some of the functions that can be provided by the AP 210. In one embodiment, the cellular module 221 may include a communication processor (CP).

Each of the WiFi module 223, the BT module 225, the GPS module 227 or the NFC module 228 may include, for example, a processor for processing the data transmitted or received through the corresponding module. In some embodiments, at least some (e.g., two or more) of the cellular module 221, WiFi module 223, the BT module 225, the GPS module 227 or the NFC module 228 may be included in one integrated chip (IC) or IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. In another embodiment, at least one of the cellular module 221, the WiFi module 223, the BT module 225, the GPS module 227 or the NFC module 228 may transmit and receive RF signals through a separate RF module.

The SIM card 224 may include, for example, a card with a subscriber identification module and/or an embedded SIM. The SIM card 224 may include unique identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD).

The external memory 234 may further include a flash drive, for example, compact flash (CF), secure digital (SD), micro secure digital (Micro-SD), mini secure digital (Mini-SD), extreme digital (xD), a memory stick or the like. The external memory 234 may be functionally and/or physically connected to the electronic device 201 through various interfaces.

The sensor module 240 may, for example, measure the physical quantity or detect the operating status of the electronic device 201, and convert the measured or detected information into an electrical signal. The sensor module 240 may include at least one of, for example, a gesture sensor 240A, a gyro sensor 240B, a barometer 240C, a magnetic sensor 240D, an accelerometer 240E, a grip sensor 240F, a proximity sensor 240G, a color sensor (e.g., red, green, blue (RGB) sensor) 240H, a biosensor 240I, a temperature/humidity sensor 240J, an illuminance sensor 240K, or a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. In some embodiments, the electronic device 201 may further include a processor configured to control the sensor module 240, separately or as a part of the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, the capacitive scheme, the resistive scheme, the infrared scheme or the ultrasonic scheme. The touch panel 252 may further include a control circuit. The touch panel 252 may further include a tactile layer, to provide a tactile or haptic feedback to the user.

The (digital) pen sensor 254, for example, may be a part of the touch panel 252, or may include a separate sheet for recognition. The key 256 may include, for example, a physical button, an optical key or a keypad. The ultrasonic input device 258 may check data by detecting sound waves with a microphone (e.g., a microphone 288) in the electronic device 201 through an input tool for generating an ultrasonic signal.

The display 260 (e.g., the display 160) may include a panel 262, a hologram device 264, or a projector 266. The panel 262 may include a structure which is the same as or similar to that of the display 160 in FIG. 1. The panel 262 may be implemented to be, for example, flexible, transparent or wearable. The panel 262, together with the touch panel 252, may be implemented as one module. The hologram device 264 may show stereoscopic images in the air using the interference of the light. The projector 266 may display images by projecting the light on the screen. The screen may be disposed on, for example, the inside or outside of the electronic device 201. In one embodiment, the display 260 may further include a control circuit for controlling the panel 262, the hologram device 264, or the projector 266.

The interface 270 may include, for example, an HDMI 272, a USB 274, an optical interface 276 or D-subminiature (D-sub) 278. The interface 270 may be included in, for example, the communication interface 170 shown in FIG. 1. Additionally or alternatively, the interface 270 may include, for example, a mobile high-definition link (MHL) interface, a secure digital (SD) card/multi-media card (MMC) interface or an infrared data association (IrDA) interface.

The audio module 280 may, for example, convert the sound and electrical signals bi-directionally. At least some components of the audio module 280 may be included in, for example, the I/O interface 150 shown in FIG. 1. The audio module 280 may process the sound information that is received or output through, for example, a speaker 282, a receiver 284, an earphone 286 or the microphone 288.

The camera module 291 is, for example, a device capable of capturing still images and videos. In one embodiment, the camera module 291 may include one or more image sensors (e.g., a front image sensor or a rear image sensor), a lens, an image signal processor (ISP), or a flash (e.g., an LED or xenon lamp).

The power management module 295 may, for example, manage the power settings of the electronic device 201. In one embodiment, the power management module 295 may include, for example, a power management integrated circuit (PMIC), a charger integrated circuit (IC), or a battery or fuel gauge. The PMIC may have a wired and/or wireless charging scheme. The wireless charging scheme may include, for example, a magnetic resonance scheme, a magnetic induction scheme, or an electromagnetic scheme, and the power management module 295 may further include additional circuits (e.g., a coil loop, a resonance circuit, a rectifier or the like) for wireless charging. The battery or fuel gauge may, for example, measure the remaining capacity, charging voltage, charging current or temperature of the battery 296. The battery 296 may include, for example, a rechargeable battery and/or a solar battery.

The indicator 297 may indicate specific status (e.g., boot status, message status, charging status or the like) of the electronic device 201 or a part (e.g. the AP 210) thereof. The motor 298 may convert an electrical signal into mechanical vibrations, thereby generating a vibration or haptic effect. Although not shown, the electronic device 201 may include a processing device (e.g., GPU) for mobile TV support. The processing device for mobile TV support may process the media data that is based on the standards such as, for example, digital multimedia broadcasting (DMB), digital video broadcasting (DVB) or mediaFLO™.

Each of above-described components of the electronic device 201 may be configured with one or more components, names of which may vary depending on the type of the electronic device 201. In various embodiments, the electronic device 201 may include at least one of the above-described components, some of which may be omitted, or may further include additional other components. Further, some of the components of the electronic device 201 according to various embodiments of the present disclosure may be configured as one entity by being combined, thereby performing the previous functions of the components in the same manner.

Figure 3:
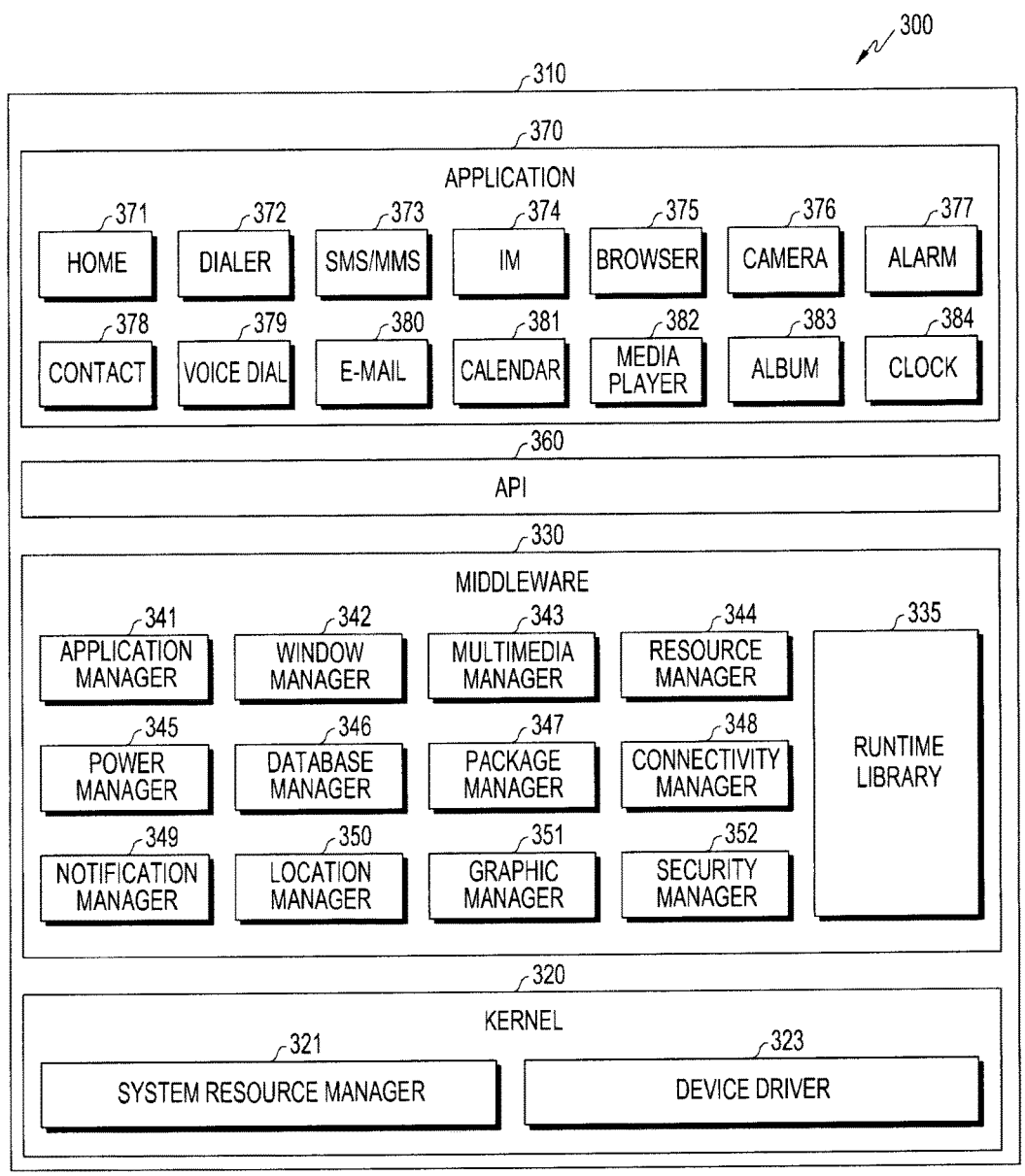
FIG. 3 is a diagram of an example of a program module, according to various embodiments of the present disclosure.

FIG. 3 illustrates a block diagram 300 of a program module 310 of an electronic device, according to various embodiments of the present disclosure. In one embodiment, the program module 310 (e.g., the program 140) may include an operating system (OS) for controlling the resources related to an electronic device (e.g., the electronic device 101), and/or a variety of applications (e.g., the application program 147) that run on the operating system. The operating system may be, for example, Android™, iOS™, Windows™, Symbian™, Tizen™, Bada™ or the like.

The program module 310 may include a kernel 320, a middleware 330, an API 360, and/or an application(s) 370. At least a part of the program module 310 may be preloaded on the electronic device, or downloaded from a server (e.g., the server 106).

The kernel 320 (e.g., the kernel 141 in FIG. 1) may include, for example, a system resource manager 321 or a device driver 323. The system resource manager 321 may control, allocate or recover (or de-allocate) the system resources. In one embodiment, the system resource manager 321 may include a process manager, a memory manager, a file system manager or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330, for example, may provide a function that is required in common by the application(s) 370, or may provide various functions to the application 370 through the API 360 so that the application 370 may efficiently use the limited system resources within the electronic device. In one embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform an I/O management function, a memory management function, an arithmetic function or the like.

The application manager 341 may, for example, manage the lifecycle of at least one of the application(s) 370. The window manager 342 may manage the graphic user interface (GUI) resources that are used on the screen. The multimedia manager 343 may identify the format required for playback of various media files, and encode or decode the media files using a codec for the format. The resource manager 344 may manage the resources such as a source code, a memory or a storage space for at least one of the application(s) 370.

The power manager 345 may manage the battery or power by operating with, for example, the basic input/output system (BIOS), and provide power information required for an operation of the electronic device. The database manager 346 may create, search or update the database that is to be used by at least one of the application(s) 370. The package manager 347 may manage installation or update of applications that are distributed in the form of a package file.

The connectivity manager 348 may manage wireless connection such as, for example, WiFi or Bluetooth. The notification manager 349 may display or notify events such as notification of message arrival, appointments and proximity in a manner that doesn't interfere with the user. The location manager 350 may manage the location information of the electronic device. The graphic manager 351 may manage the graphic effect to be provided to the user, or the user interface related thereto. The security manager 352 may provide various security functions related to the system security or user authentication. In one embodiment, if the electronic device (e.g., the electronic device 101) includes a phone function, the middleware 330 may further include a telephony manager for managing the voice or video call function of the electronic device.

The middleware 330 may include a middleware module that forms a combination of various functions of the above-described components. The middleware 330 may provide a module specialized for the type of the operating system in order to provide a differentiated function. Further, the middleware 330 may dynamically remove some of the existing components, or add new components.

The API 360 (e.g., the API 145) is a set of, for example, API programming functions, and may be provided in a different configuration depending on the operating system. For example, for Android™ or iOS™, the API 360 may provide one API set per platform, and for Tizen™, the API 360 may provide two or more API sets per platform.

The application 370 (e.g., the application program 147) may include, for example, one or more applications capable of providing functions such as a home 371, a dialer 372, a short message service/multimedia messaging service (SMS/MMS) 373, an instant message (IM) 374, a browser 375, a camera 376, an alarm 377, a contact 378, a voice dial 379, an Email 380, a calendar 381, a media player 382, an album 383, a clock 384, healthcare (e.g., for measuring the quantity of exercise, the blood glucose or the like), or environmental information provision (e.g., for providing information about the atmospheric pressure, the humidity, temperature or the like).

In one embodiment, the application 370 may include an application (hereinafter, referred to as an 'information exchange application' for convenience of description) for supporting information exchange between the electronic device (e.g., the electronic device 101) and external electronic devices (e.g., the electronic devices 102 and 104). The information exchange application may include, for example, a notification relay application for providing specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the electronic devices 102 and 104). Further, the notification relay application may, for example, receive notification information from an external electronic device, and provide the received notification information to the user. The device management application, for example, may manage at least one function (e.g., a function of adjusting the turn-on/off of the external electronic device itself (or some components thereof) or the brightness (or the resolution) of the display) of the external electronic device (e.g., the electronic device 104) communicating with the electronic device, and may manage (e.g., install, delete or update) an application operating in the external electronic device or a service (e.g., a call service or a messaging service) provided in the external electronic device.

In one embodiment, the application 370 may include an application (e.g., a healthcare application) that is specified depending on the attributes (e.g., the attributes of an electronic device, the type of which is a mobile medical device) of the external electronic device (e.g., the electronic devices 102 and 104). In one embodiment, the application 370 may include an application received or downloaded from the external electronic device (e.g., the server 106 or the electronic devices 102 and 104). In one embodiment, the application 370 may include a preloaded application or a third party application that can be downloaded from the server. The names of the components of the shown program module 310 may vary depending on the type of the operating system.

In various embodiments, at least a part of the program module 310 may be implemented by software, firmware, hardware or a combination thereof. At least a part of the program module 310 may be implemented (e.g., executed) by, for example, a processor (e.g., the AP 210). At least a part of the program module 310 may include, for example, a module, a program, a routine, an instruction set or a processor, for performing one or more functions.

The term 'module' as used herein may refer to a unit that includes, for example, one or a combination of hardware, software or firmware. The term 'module' may be interchangeably used with terms such as, for example, unit, logic, logical block, component, or circuit. The 'module' may be the minimum unit of an integrally constructed part, or a part thereof. The 'module' may be the minimum unit for performing one or more functions, or a part thereof. The 'module' may be implemented mechanically or electronically. For example, the 'module' may include at least one of an application-specific integrated circuit (ASIC) chip, field-programmable gate arrays (FPGAs), or a programmable-logic device, which are known or will be developed in the future, and which perform certain operations.

At least a part of the device (e.g., modules or functions thereof) or method (e.g., operations) according to various embodiments of the present disclosure may be implemented by a command that is stored in computer-readable storage media in the form of, for example, a programming module. If the command is executed by one processor (e.g., the processor 120), the one processor may perform a function corresponding to the command. The computer-readable storage media may be, for example, the memory 130.

The computer-readable storage media may include magnetic media (e.g., a hard disk, a floppy disk, and magnetic tape), optical media (e.g., a compact disc read-only memory (CD-ROM) and a digital versatile disc (DVD)), magneto-optical media (e.g., a floptical disk), and a hardware device (e.g., a read-only memory (ROM), a random-access memory (RAM) and a flash memory). The program command may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic way. Some operations may be performed in different order or omitted, or other operations may be added.

The embodiments disclosed herein have been presented for the description and understanding of the technical details thereof, but not intended to limit the scope of the present disclosure. Therefore, the scope of the present disclosure should be construed to include all modifications or various other embodiments based on the spirit of the present disclosure.

Figure 4:
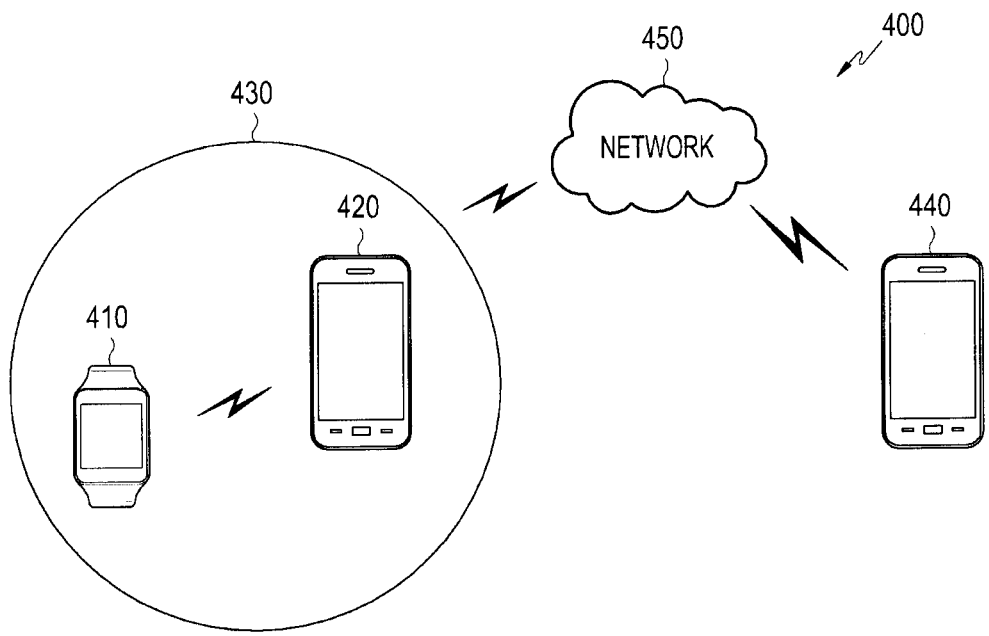
FIG. 4 is a diagram of an example of a communication system, according to various embodiments of the present disclosure.

FIG. 4 is a diagram of an example of a communication system 400, according to various embodiments of the present disclosure. In one embodiment, the short-range communication system 400 may include, for example, a first electronic device 410, a second electronic device 420 and a third electronic device 440.

The first electronic device 410 (e.g., the electronic device 102) may be a wearable device (e.g., a smart watch or smart glasses). The second electronic device 420 (e.g., the electronic device 101) may be a mobile terminal (e.g., a smartphone or a tablet PC).

In one embodiment, the first electronic device 410 may transmit and receive messages or data to/from the second electronic device 420 through a short-range connection 430. The second electronic device 420 may communicate with the third electronic device 440 (e.g., the electronic device 104) via a network 450 (e.g., the network 162).

In one embodiment, the second electronic device 420 may receive messages from the third electronic device 440 over the network 450. The second electronic device 420 may transmit the messages to the first electronic device 410 through the short-range connection 430. A user holding or wearing the first electronic device 410 may view a message received by the second electronic device 420 or other information related to the message through the first electronic device 410, or may use the first electronic device 410 to execute a function/service related to the message.

In one embodiment, the second electronic device 420 may receive audio data (e.g., radio streaming) from the third electronic device 440 (e.g., the server 106) over the network 450 (or the network 162). The first electronic device 410 may receive the audio data provided by the third electronic device 440 via second electronic device 420 and the short-range connection 430. The user holding or wearing the first electronic device 410 may access the audio data received by the second electronic device 420 or other information related to the audio data through the first electronic device 410, or may be provided with a function/service related to the audio data with low power.

In one embodiment, the first electronic device 410 may periodically receive a beacon signal from the second electronic device 420 or an external device (e.g., a beaconing device). The first electronic device 410 may compare pre-stored information to data included in a beacon signal and determine whether to perform a function/service related to the data included in the beacon signal.

Figure 5:
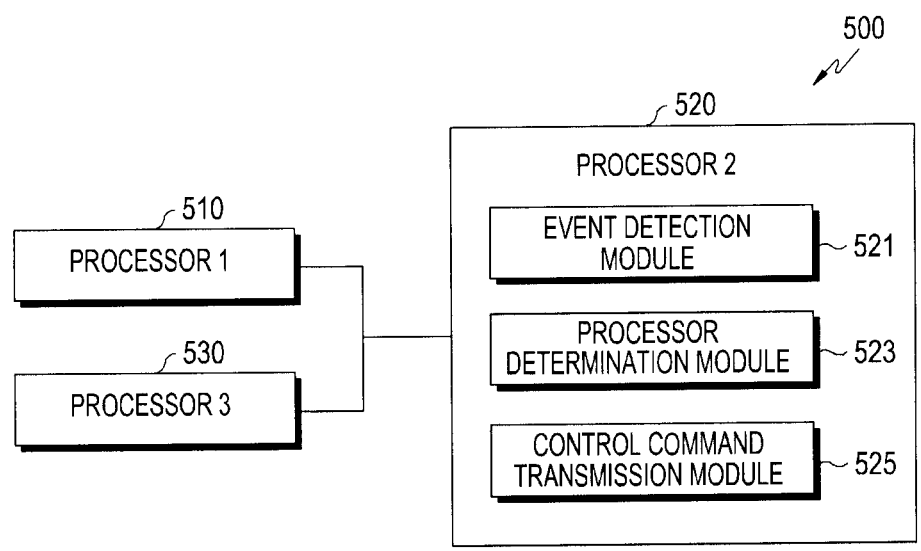
FIG. 5 is a diagram of an example of an electronic device, according to various embodiments of the present disclosure.

FIG. 5 is a diagram of an example of an electronic device 500, according to various embodiments of the present disclosure. As illustrated, the electronic device 500 may include a plurality of processors, e.g., a first processor 510, a second processor 520 and a third processor 530.

In one embodiment, in order to reduce its power consumption, the electronic device 500 may operate the processors in a plurality of operation modes (e.g., an active mode, and a sleep mode) having different degrees of power consumption. By way of example, the operation modes may include an active mode and a sleep mode. The active mode may be a state in which, for example, a processor is activated, and then processes a specific task assigned to the processor. If the processor is in the active mode, the processor and other hardware connected to the processor may be provided with the power, and used to perform the assigned task. The sleep mode may be a state in which when a processor is not in operation. For example, the processor may be inactive, and waiting for a task assignment. If the processor is in the sleep mode, the processor and other hardware connected to the processor may consume less power than otherwise, or consume no power at all. Therefore, the electronic device may more efficiently manage the power consumption by operating a plurality of processors in a plurality of operation modes.

The first processor 510 may perform a function of controlling the overall operation of the electronic device 500 or a signal flow between internal components of the electronic device 500, and of processing the data. The first processor 510 may include, for example, a CPU or an AP, but it is not limited thereto.

The second processor 520 may include, for example, an event detection module 521, a processor determination module 523 and a control command transmission module 525. Each of the modules 521-252 may be implemented in hardware (e.g., as part of the processor 520), software (e.g., as part of an operating system or bios executed by the processor 520), and/or a combination of hardware or software.

The event detection module 521 may, for example, detect an event associated with the electronic device 500. The event associated with the electronic device 500 may include a mode change in one of the processors 510 and 530 (e.g., a change from the active mode to the sleep mode, or a change from the sleep mode to the active mode); detection of external environmental information through a sensor (e.g., the sensor module 240) functionally connected to the electronic device 500; reception of messages or data from an external electronic device; and a timer event. The processor determination module 523 may, in response to an event detected by the event detection module 521, select which one of the plurality of processors 510, 520 and 530 will perform an operation related to the event. The control command transmission module 525 may transmit a command to change an operation mode of the selected processor in order to perform an operation related to the event. For example, if the first processor 510 is selected to perform the operation related to the event, the second processor 520 may transmit to the first processor 510 (or other components connected to the first processor, such as the power management module 295 shown in FIG. 2) a control command for changing an operation mode of the first processor 510 from the sleep mode to the active mode. Alternatively, the control command transmission module 525 may change the operation mode of the first processor 510 by changing the state of a designated register. A process of changing an operation mode of a processor may vary depending on the implementation method, so the process is not limited thereto.

In one embodiment, the second processor 520 may include, for example, a microprocessor unit (MPU), a micro control unit (MCU), a sensor hub processor, a low-power processor or the like. The second processor 520 may be characterized by a lower power consumption and/or processing power than the first processor 510.

The third processor 530 may operate as a backup to the first processor 510 when the first processor 510 is in the sleep mode. More particularly, the third processor 530 may perform some functions of the first processor 510 with low power, if the first processor 510 is in the sleep mode. In one embodiment, the third processor 530 may, for example, display simple image information stored in a memory (e.g., the memory 130) functionally connected to the third processor 530 on a display (e.g., the display 160) functionally connected to the electronic device 500 by means of a display controller. In one embodiment, the third processor 530 may output audio data stored in the memory (e.g., the memory 130) functionally connected to the third processor 530 through an audio module (e.g., the audio module 280) functionally connected to the electronic device 500. In one embodiment, if another processor (e.g., the first processor 510) is in the sleep mode, the third processor 530 may manage power supply of other components (e.g., the audio module 280 or the input device 250) connected to the first processor 510. The third processor 530 may, for example, transmit power supply-related commands to a power management module (e.g., the power management module 295) of the electronic device 500.

Figure 6A:
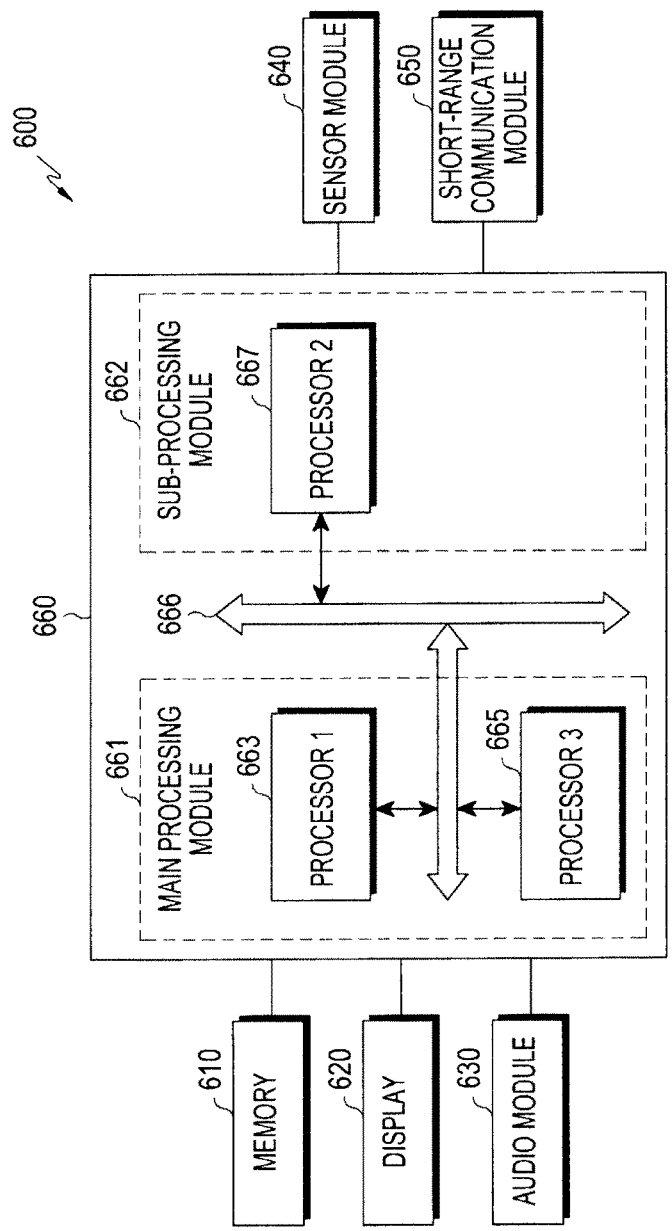
FIG. 6A is a diagram of an example of an electronic device, according to various embodiments of the present disclosure.
Figure 6B:
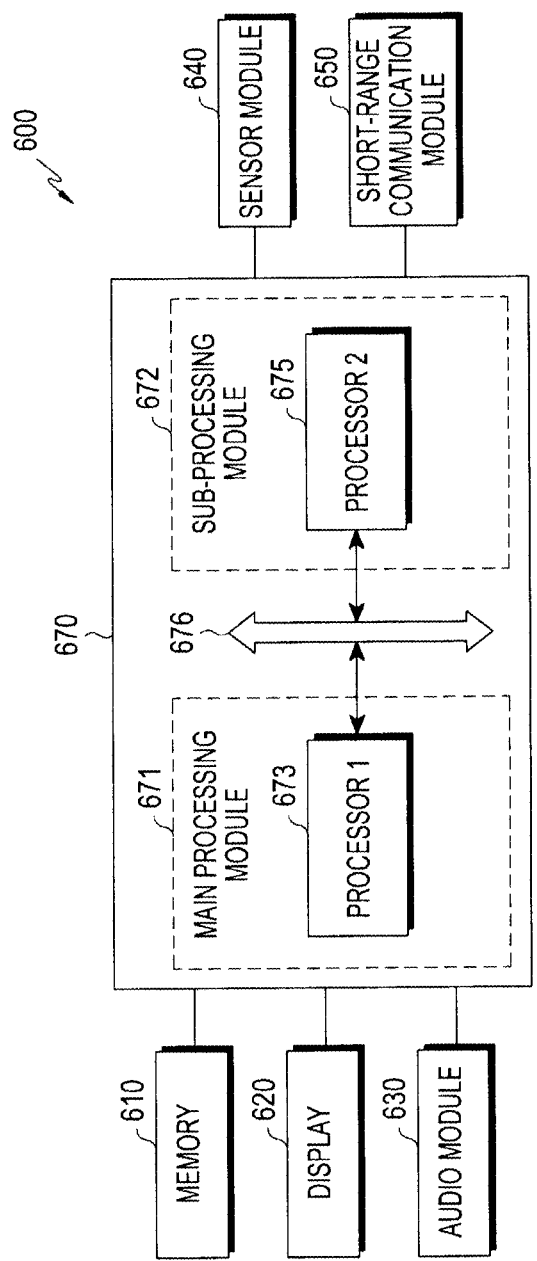
FIG. 6B is a diagram of an example of an electronic device, according to various embodiments of the present disclosure

FIGS. 6A and 6B are block diagrams of an example of an electronic device 600, according to various embodiments of the present disclosure. The electronic device 600 may include any suitable type of wearable device, such as the first electronic device 410, which is shown in FIG. 4.

Referring to FIG. 6A, the electronic device 600 may include a memory 610, a display 620, an audio module 630, a sensor module 640, a short-range communication module 650, and a processor module 660.

The memory 610 may store a variety of data that is executed and/or processed by the electronic device 600, including an operating system or various applications of the electronic device 600.

The memory 610 may include, for example, a data area and a program area. The data area of the memory 610 may store data that is created in the electronic device 600 or downloaded from an external source, or metadata indicating the attribute of the data. In one embodiment, the program area of the memory 610 may store an operating system for booting the electronic device 600, a telephony application, a video/music playback function, an image display function, a camera shooting function or the like.

In one embodiment, the memory 610 may be accessed by each of a plurality of processors 663, 665 and 667, and may further include separate dedicated memory areas (e.g., a first processor-dedicated memory area, a second processor-dedicated memory area or a third processor-dedicated memory area). In some embodiments, each of the dedicated memory areas may be allocated to a different respective one of the processors 663, 665, and 667 such that the respective processor can read and/or write data to that memory area. These dedicated memory areas may be formed outside the corresponding processors, and/or may be formed as an internal circuit (or a register) of the corresponding processors.

In some embodiments, access permissions associated with a given dedicated memory area that is assigned to one of the processors 663, 665, and 667 may be changed when another one of the processors 663, 665, and 667 transitions from one mode into another. In one embodiment, the second processor-dedicated memory area (e.g., SRAM), for example, may be set to be accessible by the second processor 667, if the first processor 663 has entered the sleep mode. The third processor-dedicated memory area (e.g., SRAM), for example, may be set to be accessible by the third processor 665, if the first processor 663 has entered the sleep mode.

The display 620 (e.g., the display 260) may display the information input by the user or the information provided to the user, including various menus of the electronic device 600. The display 620 may provide various screen images for the user of the electronic device 600. The display 620 may provide a menu screen, a message creation screen, a telephony screen, a game screen, a music playback screen, a video playback screen or the like.

For example, if the display 620 includes a touch screen, the display 620 may recognize a touch input on the touch screen, and forward an input signal corresponding thereto to a main processing module 661 or the first processor 663. The first processor 663 may, for example, perform a function related to the touch input in response to the input signal.

The sensor module 640, which is connected to a sub-processing module 662 (or the second processor 667), may detect or collect one or more types of sensor data (e.g., location information or a change in the environment) related to the electronic device 600, and provide the detected or collected sensor data to the sub-processing module 662 (or the second processor 667). In one embodiment, the operation of the sensor module 640 may be controlled by the second processor 667. The sensor module 640 may operate with low power.

The short-range communication module 650 may perform short-range communication with an external electronic device (e.g., the electronic device 420). In one embodiment, the short-range communication module 650 may include a Bluetooth module or a low-power WiFi module, but it is not limited thereto. In the following description, a Bluetooth module will be given as an example of the short-range communication module 650 to facilitate understanding of the present disclosure.

In one embodiment, the short-range communication module 650 may transmit and receive BT packets or Bluetooth low energy (BLE) packets. If the first processor 663 is in the active mode, the short-range communication module 650 may perform BT communication or BLE communication under control of the first processor 663. If the first processor 663 is in the sleep mode, the short-range communication module 650 may perform BLE communication under control of the second processor 667.

In one embodiment, the term 'BLE module' refers to a communication technology module that has a relatively short duty cycle compared to the high-speed Bluetooth technology, and has significantly reduced the power consumption through a low data rate. A packet transmitted/received by the BLE module may be a data packet (e.g., a BLE packet) transmitted at a rate of, for example, about 1 Mbps, but it is not limited thereto.

In one embodiment, the term 'BT module' refers to a module for high-speed Bluetooth communication technology or mass Bluetooth communication technology in addition to the BLE communication technology. A packet transmitted/received by the BT module may be a data packet (e.g., a BT packet) transmitted at a rate of, for example, about 4 Mbps, but it is not limited thereto.

In one embodiment, the term 'Bluetooth communication data' refers to data that is transmitted/received over a Bluetooth communication channel, and the Bluetooth communication data may be divided into BLE packets or BT packets depending on, for example, the transfer rate or the power consumption.

In one embodiment, the processing module 660 may include the main processing module 661 and the sub-processing module 662. The main processing module 661 may include the first processor 663 and the third processor 665. The first processor 663 may be a high-performance processor. The third processor 665 may be a low-power processor. Thus in some implementations, the third processor 665 may have lower power consumption than the first processor 663. Additionally or alternatively, in some implementations, the third processor 665 may have less processing power than the first processor 661. For example, the third processor 665 may have a lower operating frequency, be able to perform fewer floating point operations per second (FLOPS), and/or be able to execute fewer generic instructions per second.

In one embodiment, the main processing module 661 may include a high-performance processor that operates at a relatively high rate compared with the sub-processing module 662. For the electronic device, the sub-processing module 662 may use a low-performance processor in order to reduce the power consumption. Thus, in some implementations, the second processor 667 may have lower power consumption and/or processing power than the first processor 661. For example, the second processor 667 may have a lower operating frequency, be able to perform fewer floating point operations per second (FLOPS), and/or be able to execute fewer generic instructions per second. If the main processing module 661 is in the sleep mode, the sub-processing module 662 may operate in the active mode to perform some functions such as sensing with relatively low power.

In one embodiment, the first processor 663 may process short-range communication data (e.g., Bluetooth communication data) received through the short-range communication module 650 in the active mode. The first processor 663 may process BLE packets or BT packets in the active mode.

If the first processor 663 is in the sleep mode, the third processor 665 may perform some functions of the first processor 663 by consuming relatively less power compared with the first processor 663.

The sub-processing module 662 may include the second processor 667. The second processor 667 may be connected to the short-range communication module 650. If the first processor 663 is in the sleep mode, the second processor 667 may obtain BLE packets or BT packets from the short-range communication module 650. The second processor 667 may analyze header or profile information included in the obtained BLE packets or BT packets, and use the outcome of the analysis to select one of the plurality of processors 663, 665 and 667 to perform an operation related to the obtained BLE packets or BT packets.

In one embodiment, if the processor selected to perform an operation related to the obtained BLE packets or BT packets is the first processor 663, the second processor 667 may transmit a command to change an operation mode of the first processor 663, to a power management module (e.g., the power management module 295). Upon transmission of the command to change an operation mode, or independently, the second processor 667 may provide, to the first processor 663, information indicating the position where the BLE packets or the BT packets are stored, or the operation to be performed in relation to the BLE packets or BT packets. Alternatively, if the second processor 667 is selected to perform the operation related to the obtained BLE packets or BT packets, the second processor 667 may perform the operation related to the BLE packets or BT packets based on the information included in the BLE packets or BT packets obtained from the short-range communication module 650.

In one embodiment, regardless of the operation mode of the first processor 663, the second processor 667 may obtain sensor data from the sensor module 640, and provide the obtained sensor data to other components of the electronic device 600 or perform an operation related to the sensor data. For example, if the operation mode of the first processor 663 is the sleep mode, the second processor 667 may obtain short-range communication data received through the short-range communication module 650, to perform an operation related to the short-range communication data.

In one embodiment, the second processor 667 may detect an event associated with the electronic device 600. By way of example, the event may include a sensor event, a communication event, and/or a timer event. For example, the second processor 667 may detect a sensor event that occurs if the second processor 667 obtains from the sensor module 640 sensor data that satisfies a predetermined criterion. As another example, the second processor 667 may detect a short-range communication event that occurs if the second processor 667 receives a message from an external electronic device (e.g., the electronic device 420) through the short-range communication module 650. As yet another example, the second processor 667 may detect a timer event that occurs if a predetermined time has elapsed from a specific time, by means of a timer functionally connected to the electronic device 600, and then perform a specific operation accordingly. In one embodiment, the second processor 667 may include a timer circuit for the timer event.

In one embodiment, if the operation mode of the first processor 663 is the sleep mode, the second processor 667 may detect whether the detected event is one associated with an operation for outputting information on the display 620. If the detected event is an event associated with an operation for outputting information, the second processor 667 may determine which one of the plurality of processors 663, 665 and 667 corresponds to the processor for performing the corresponding operation. If the first processor 663 is selected to perform the corresponding operation, the second processor 667 may transmit a command to switch the operation mode of the first processor 663 from the sleep mode to the active mode, to the power management module in charge of the first processor 663 (e.g., the power management module 295). If the third processor 665 is selected to perform the corresponding operation, the second processor 667 may transmit a command to change an operation mode of the third processor 665 to the power management module in charge of the third processor 665 (e.g., the power management module 295).

In one embodiment, each processor (e.g., the first processor 663, the second processor 667 or the third processor 665) may provide information about the operation that each processor should perform, through a communication unit (e.g., a mailbox) for inter-processor communication. For example, if the first processor 663 is in the sleep mode, the second processor 667 may provide the first processor 663 with information about the operation that the first processor 663 should perform when the first processor 663 is switched from the sleep mode to the active mode, through the communication unit (e.g., the mailbox).

In one embodiment, each processor (e.g., the first processor 663, the second processor 667 or the third processor 665) may receive an interrupt signal indicating that a data output operation has been completed. For example, if the third processor 665 displays information (e.g., image data displayable with low power) that is to be output on the display 620, the third processor 665 may provide an interrupt signal indicating that the third processor 665 has displayed the corresponding information, to the first processor 663 and/or the second processor 667. Upon receiving the interrupt signal, the first processor 663 may determine whether to create information that is to be output later based on the interrupt signal. In one embodiment, at least two or more of the plurality of processors 663, 665 and 667 may be implemented as one system on a chip (SoC). Therefore, each of at least two or more processors implemented as one SoC may access the remaining processors in units of addresses through an internal interface 666 (e.g., a bus). Each of the plurality of processors 663, 665 and 667 may perform communication (e.g., control messages and/or data) between processors through the bus. As for a connection scheme of the internal interface 666, the internal interface 666 may be configured as, for example, an advanced extensible interface/advanced high-performance bus (AXI/AHB) interface. In one embodiment, two buses are shown for a better understanding of the present disclosure, but actually the buses may be hierarchically divided, and more buses may be used. In addition, when the power management module (e.g., the power management module 295) manages the power (e.g., during power gating), not all the buses in the electronic device 600 may undergo collective interruption of power supply.

Referring to FIG. 6B, a processing module 670 may include, for example, a main processing module 671 and a sub-processing module 672. The main processing module 671 may include a first processor 673. The sub-processing module 672 may include a second processor 675. The second processor 675 may be a low-power processor. The second processor 675 may have lower power consumption and/or processing power than the first processor 673. For example, the second processor 675 may have a lower operating frequency, be able to perform fewer floating point operations per second (FLOPS), and/or be able to execute fewer generic instructions per second.

The second processor 675 may perform, for example, the function of the third processor 665 shown in FIG. 6A. For example, the second processor 675 may access the memory 610. Further, the second processor 675 may control the display 620 through a display controller. Further, each of the first processor 673 and the second processor 675 may access other processors in units of addresses through an internal interface 676 (e.g., a bus). The processing module 670, unlike the processing module 660 shown in FIG. 6A, may not include a separate processor, such as the third processor 665, or may be configured to include a component corresponding to the third processor 665 as the second processor 675 or at least a part of the sub-processing module 672.

Figure 7:
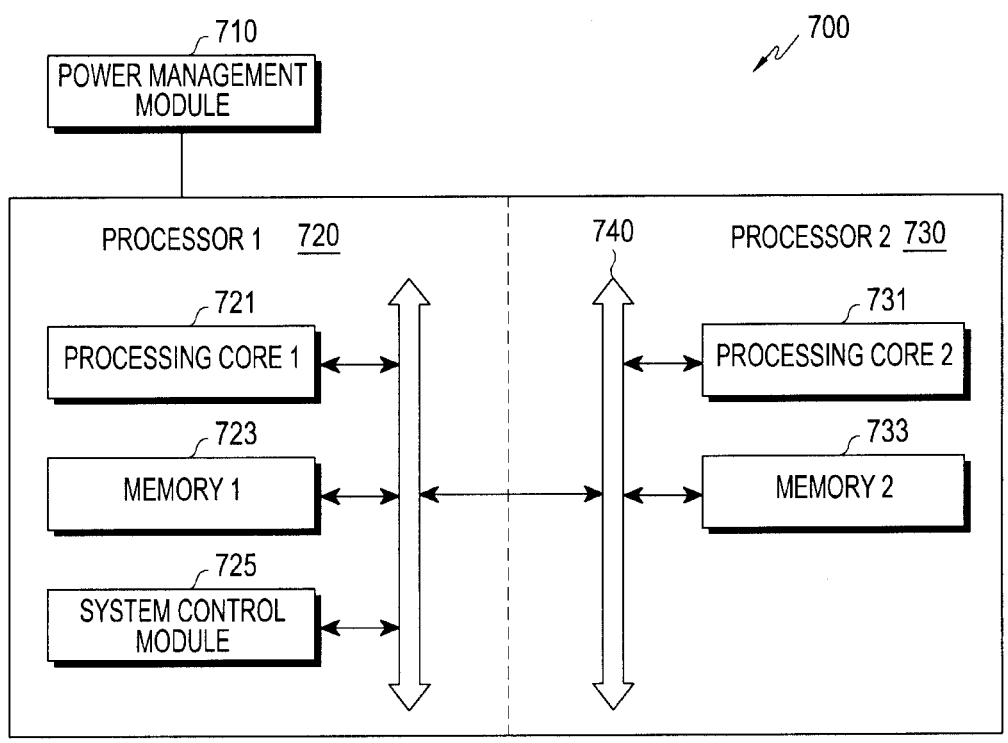
FIG. 7 is a diagram of an example of an electronic device, according to various embodiments of the present disclosure.

FIG. 7 is a diagram of an example of an electronic device 700, according to various embodiments of the present disclosure. In some embodiments, the electronic device 700 may include a wearable electronic device, such as the first electronic device 410. As illustrated, the electronic device 700 (e.g., the first electronic device 410) may include, for example, a power management module 710, a first processor 720 and a second processor 730.

The power management module 710 may manage the power settings of the electronic device 700. The power management module 710 may include, for example, a power management integrated circuit (PMIC).

The first processor 720 (e.g., the first processor 510) may include, for example, a first processing core 721, a first memory 723 and a system control module 725. The first processing core 721 may, for example, execute a first operating system. The first memory 723 may, for example, store executable code belonging to the first operating system (e.g., in a program area of the first memory 723). The first memory 723 may store data that is executed and/or processed by the electronic device 700. The system control module 725 may transmit a reset command to the first processor 720 or the second processor 730. The system control module 725 may, for example, control an operation mode of at least one of the first processor 720 or the second processor 730 through the power management module 710.

The second processor 730 (e.g., the second processor 520) may include, for example, a second processing core 731 and a second memory 733. The second processing core 731 may execute a second operating system. The second memory 733 may store a binary code for driving the second operating system (e.g., in a program area of the second memory 733).

The second processor 730 may, for example, select a processor for performing an operation corresponding to an event associated with the electronic device 700, based on a characteristic of that event. The second processor 730 may provide, to the power management module 710, a command to change an operation mode of the selected processor. Based on the command, the power management module 710 may change the state of the selected processor by increasing (or starting) the supply of power to the selected processor or other components connected to the processor.

In one embodiment, the power management module 710 may monitor an operation mode of the first processor 720 or the second processor 730, so the current operation mode may partially interrupt the power supply for the processor whose current operation mode is the sleep mode, or other components connected to the processor. The power management module 710 may supply power to the processor whose current operation mode is the active mode, or other components connected to the processor. In one embodiment, the second processor 730 may perform a session-related operation based on the power supplied by the power management module 710, or may process sensor data that is obtained through the sensor module of the electronic device 700.

In one embodiment, the first processor 720 or the second processor 730 may execute at least a portion of a driver for the short-range communication module. For example, the first processor 720 may execute at least a part of a BT stack or a BLE stack for driving the short-range communication module (e.g., the BT module or the BLE module). As another example, the second processor 730 may include a BLE stack for driving the short-range communication module. Depending on the implementation method, the first processor 720 may include an upper portion of the BLE stack, and the second processor 730 may include a lower portion of the BLE stack, but it is not limited thereto.

In one embodiment, the first processor 720 and the second processor 730 may be integrated into the same SoC. Communication between the first processor 720 and the second processor 730 may be effectuated through an internal interface 740 (e.g., a bus). The first processor 720 may be given permission to access both the first memory 723 and the second memory 733. The second processor 730 may be given permission to access the second memory 733 only. The first memory 723 and the second memory 733 may be separate storage spaces or one storage space (e.g., the memory 610), but they are not limited thereto.

In one embodiment, the first processor 720 and the second processor 730 may sequentially boot independent operating systems (e.g., the first operating system and the second operating system). The first processor 720 may boot the first operating system using the first memory 723. For example, the power management module 710 may supply the power only to the first memory 723 and the system control module 725 (e.g., a reset management unit (RMU)) while keeping other peripheral devices powered off (e.g., a universal asynchronous receiver/transmitter (UART), direct memory access (DMA), a timer, secure digital input output (SDIO) and the like). If a first reset signal (e.g., power on reset) is received by the system control module 725 (e.g., the RMU) from the power management module 710, a system reset process may be internally performed by the system control module 725 (e.g., the RMU) in response to the first reset signal. As a result of the system reset process being performed, the first processing core 721 may start booting the first operating system. In doing so, the first processing core 721 may, for example, initialize the first memory 723 (e.g., a DRAM or an embedded multimedia card (eMMC)), and load a boot binary code belonging to the first operating system.

In one embodiment, if the booting of the first operating system is completed, the first processing core 721 may load a boot binary code of the second operating system on the second memory 733 (e.g., an SRAM) through the first memory 723. For example, if an address of an area on the second memory 733 is 0x0800_0000 on an address memory map of the first processing core 721, a copy operation for the boot binary code of the second operation system may also be addressed by 0x0800_0000. A corresponding area (corresponding to 0x0800_0000) of the second memory 733 may be remapped to 0x0000_0000 on an address memory map of the second processing core 731. If a program area of the second memory 733 is remapped to 0x0000_0000, the system control module 725 may provide a software reset signal to the second processor 730, so the second processing core 731 may perform a reset operation. A PC counter of the second processing core 731 may perform booting by recognizing a starting address of the second memory 733 as 0x0000_0000.

In one embodiment, the second processor 730 may boot the second operating system by executing the boot binary code of the second operating system using the second memory 733. A program area of the second memory 733 may store a boot binary code of the second operating system as desired in the electronic device 700, but it is not limited thereto. In one embodiment, the second processor 730 may set a program area of the second memory 733 as an exclusive area so that other processors (e.g., the first processor 720) may not access the area. The first processor 720 may be given access to the remaining areas (e.g., the data area) of the second memory 733 except for the program area.

In one embodiment, assuming that the size of the program area of the second memory 733 is, for example, 32 KB, after the second operating system is booted by the second processing core 731, since an area of 0x0803_FFFF, which is an area from 0x0800_0000 to 32 KB, is a program area for the second processing core 731, the first processing core 721 may be denied permission to access the area. The first processing core 721 may access the area beginning at 0x0804_0000. In one embodiment, since a shared address map function could make it possible to access a corresponding area (after 0x0804_0000) with another address (e.g., 0x2004_0000) on the basis of the address map of the second processing core 731 is implemented on the bus architecture, the first processing core 721 and the second processing core 731 may use the corresponding area together.

In one embodiment, depending on the operation mode of each processor, the power management module 710 may detect whether to supply power to each processor and other components related to each processor. For example, when the first processor 720 operates in the sleep mode, the second processor 730 may also operate in the sleep mode. In this case, the power management module 710 may supply power to the second memory 733 normally (e.g., in the substantially same way as a case where the second processor 730 is in the active mode), while cutting off the supply of power to the second processing core 731. When the first processor 720 operates in the sleep mode, the second processor 730 may operate in the active mode. If the second processor 730 operates in the active mode, the power management module 710 may supply the power to the second processing core 731 and the second memory 733 of the second processor 730.

In one embodiment, the first processor 720 may provide information identifying one or more operations that the second processor 730 should perform, through a communication unit (e.g., a mailbox). If there are no operations that the first processor 720 should perform, the first processor 720 may switch from the active mode to the sleep mode in order to reduce the power consumption. The power management module 710 may subsequently wake up the first processor 720 when needed. If the first processor 720 is selected to perform an operation associated with an event, the second processor 730 may transmit to the first processor 720 information about the operation through the communication unit, and then transmit a command to the power management module to switch the operation mode of the first processor 720 from the sleep mode to the active mode. The electronic device according to an embodiment of the present disclosure is illustrated to include the first processor 720 and the second processor 730, but the electronic device may further include an additional processor (e.g., the third processor 665) and/or an additional processing core in at least one of the first processor 720 or the second processor 730. Depending on the operation mode of an additional processor, the power management module 710 may control the power supply of the processor and other components related to the processor.

Figure 8:
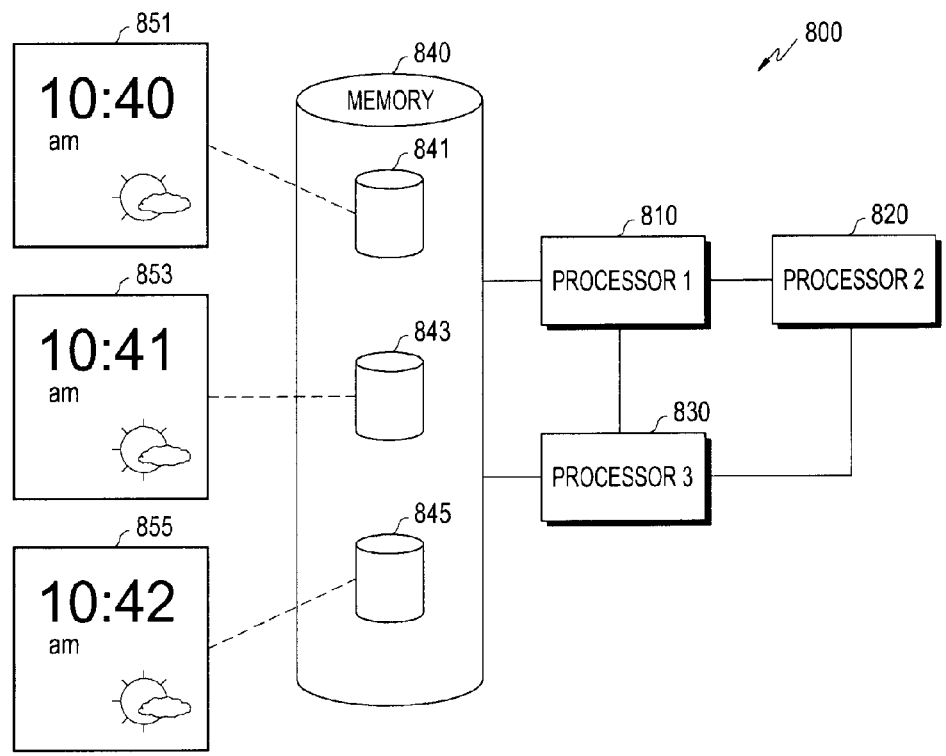
FIG. 8 is a diagram illustrating an example of the operation of an electronic device, according to various embodiments of the present disclosure.

FIG. 8 is a diagram illustrating an example of the operation of an electronic device 800, according to various embodiments of the present disclosure. In some embodiments, the electronic device 800 may be a wearable device, such as the first electronic device 410. As illustrated, the electronic device 800 may be configured to provide a time screen when it is in different operational modes.

In one embodiment, since displaying the time screen is not resource-intensive, the electronic device 800 may set a first processor 810 so as to operate in the sleep mode, and display the time screen by using a third processor 830 that has lower power consumption than the first processor 810.

In one embodiment, the first processor 810 may store time-related images to be displayed on the display in a memory 840 (e.g., the memory 610) accessible by the first processor 810 or a second processor 820. For example, the first processor 810 may create images (e.g., bitmaps, etc.) for a first time 851 (e.g., 10:40 am), a second time 853 (e.g., 10:41 am) that is one minute after the first time 851, and a third time 855 (e.g., 10:42 am) that is two minutes after the first time 851, and store the created images in first to third memory areas 841 to 845, respectively. The first processor 810, in the active mode, may cause the second processor 820 to start a timer at the first time 851, and then switch to the sleep mode. The second processor 820 may start the timer at the first time 851, and if a predetermined period (e.g., one minute) has elapsed since the first time 851, the second processor 820 may detect a timer event. In response to the timer event, the second processor 820 may identify the display of a time screen as an operation associated with the event, and provide the third processor 830 with a command execute the operation and display another time screen. Based on the command from the second processor 820, the third processor 830 may switch from sleep mode to the active mode. The third processor 830 may display, on the display, the image for the second time 853, which is stored in the second memory area 843 in the memory 840. For example, the third processor 830 may set a register in a display controller so that the display controller may display the image for the second time 853. The third processor 830 may then switch from the active mode to the sleep mode after the display operation is completed. If a predetermined time period set in the timer has again elapsed, the second processor 820 may transmit a command to change an operation mode of the third processor 830 in order to again refresh the time screen. The third processor 830 may display, on the display, the image for the third time 855 that is two minutes after the first time 851, which is stored in the third memory area 845. Therefore, by generating two additional time screens ahead of time, the first processor 810 may operate in the sleep mode for three minutes, and conserve power this way.

In a case where the partial display can be implemented, the electronic device 800 may be set such that only the partial screen requiring update on the previous screen may be continuously updated, and the remaining screen except for the partial screen may be continuously maintained without change. The third processor 830 may store a small amount of data (e.g., a partial screen requiring update) in a memory (e.g., a third memory (not shown)) that is separately controlled by the third processor 830, and update the display associated with the corresponding event based on the event detection by the second processor 820. In the example of the FIG. 8, the partial screen may include only the portion of a given time screen that includes the digits which indicate the time.

In one embodiment, an electronic device may include a first processor and a second processor, and the second processor may be configured to select a processor for performing one or more operations for presenting first information among a plurality of processors including the first processor and a third processor, based on an event associated with the electronic device, and to provide a first command for performing the one or more operations to the selected processor.

In one embodiment, the first processor, the second processor, and the third processor may be implemented on the same chip.

In one embodiment, the performance capability of the first processor may be better than performance capability of the second processor.

In one embodiment, the electronic device may further include a power management module that is functionally connected to the first processor, the second processor, and the third processor, and the power management module may be configured to change an operation mode of the processor for performing one or more operations based on the first command.

In one embodiment, the second processor may be connected to a short-range communication module, and the second processor may be configured to receive first data from an external electronic device through the short-range communication module if the first processor is in a sleep mode.

In one embodiment, the first processor may be configured to drive a first operating system, and the second processor may be configured to drive a second operating system.

In one embodiment, the first processor may be configured to boot the first operating system using a first memory functionally connected to the first processor, and to load a boot binary code of the second operating system on a second memory functionally connected to the second processor through the first memory, and the second processor may be configured to boot the second operating system by executing the boot binary code, using the second memory.

In one embodiment, the first processor may be configured to access at least one of the first memory or the second memory, and the second processor may be configured to access the second memory.

In one embodiment, the first processor may be configured to access a remaining area except for a program area of the second memory.

In one embodiment, the second processor may be configured to obtain first data associated with the first information from an external electronic device and to store the first data in the second memory, and if the processor for performing one or more operations is the first processor, the first memory may be configured to obtain the first data by accessing the second memory based on the first command, and to perform the one or more operations based on the first data.

In one embodiment, if the first processor is in a sleep mode, the second processor may be configured to transmit, to the first processor, second information about an operation that the first processor will perform when the first processor switches from the sleep mode to an active mode.

In one embodiment, the first processor may be configured to store second data to be used for the one or more operations in a memory accessible by the third processor, and if the processor for performing one or more operations is the third processor, the third processor may be configured to access the memory in order to use the second data based on the first command.

In one embodiment, the third processor may be configured to consume less power compared to the first processor, and the second processor may be configured to select the third processor as the processor for performing one or more operations, when the event is a timer event that occurs periodically, and the one or more operations may be an operation for presenting an image corresponding to the event among previously stored images, or an operation that can be performed with low power.

In one embodiment, the second processor may be configured to select the third processor as the processor for performing one or more operations, in a case where the event is an event that has occurred when the second processor has received a beacon signal including product information related to an external device from the external device that is located within a predetermined distance from the electronic device, and the product information corresponds to setting information that is set by a user of the electronic device.

Figure 9:
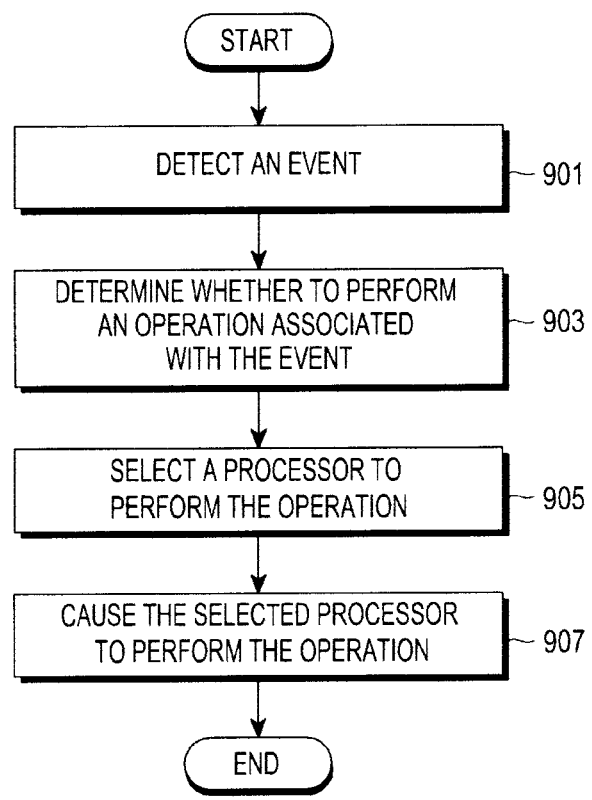
FIG. 9 is a flowchart of an example of a process, according to various embodiments of the present disclosure.

FIG. 9 is a flowchart of an example of a process, according to various embodiments of the present disclosure. Referring to FIG. 9, if a detected event is a specific event), an electronic device (e.g., the first electronic device 410) including a plurality of processors may select one of the plurality of the processors to perform an operation related to the event. The operation may include the display of information related to the event. Although in the present example, the operation involves the output of information on a display, any suitable type of information output may be used instead. For example, the information may be output audibly, by using tactile feedback, by using one or more light-emitting diodes (LEDs) that are separate from the electronic device's display, etc.

In operation 901, a specific processor (e.g., the second processor 520) among a plurality of processors may detect an event associated with the electronic device. The event may include, for example, reception of sensor data such as a measurement of ambient sound and light around the electronic device, an indication of a characteristic of the movement and orientation of the electronic device; reception of messages/data from an external electronic device (e.g., the electronic device 420) (through short-range communication); or a timer event.

In one embodiment, for detection of a timer event, a specific processor may include a timer in an internal circuit of the specific processor or other components adjacent to the specific processor. In this case, the specific processor may detect a timer event that occurs if a predetermined time perform has elapsed after the starting the timer.

In operation 903, in response to the event being detected in operation 901, the specific processor may detect whether to perform an operation associated with the event. For example, the specific processor may determine whether to display information related to the event on the display. For example, if the detected event is a message reception event, the specific processor may determine whether an operation related to the event needs to be performed based on the information included in at least a part (e.g., a header) of the received message. For example, if a predetermined type of information is included in the received message, the specific processor may determine that an output operation needs to be performed in order for the information to be displayed.

In operation 905, if the specific processor determines that the operation needs to be performed, the specific processor may select another processor to perform the operation. In one embodiment, the specific processor (e.g., the second processor 520) may select one of the remaining processors (e.g., the first processor 510 and the third processor 530) to perform the operation.

In another embodiment, the specific processor may select itself to perform the operation.

In operation 907, the specific processor causes the processor selected at operation 905 to perform the operation. For example, the specific processor may generate a command which when executed by the selected processor causes the selected processor to execute the operation related to the event. The processor may transmit (or forward) the command to the selected processor using any suitable type of inter-process communication (e.g., mailbox). Furthermore, if the processor selected in operation 905 is in the sleep mode, the specific processor may issue a command for changing an operation mode of the processor. In one embodiment, if it is determined that the second processor or the third processor cannot process the message (e.g., the message is displayed on the display), the second processor may select the first processor as a processor for processing the message, based on the profile of the message (e.g., the BT packet), and if the first processor is in the sleep mode, the specific processor may transmit a command to change an operation mode of the first processor to the first processor or other components (e.g., the power management module 710 in FIG. 7) connected to the first processor.

Figure 10A:
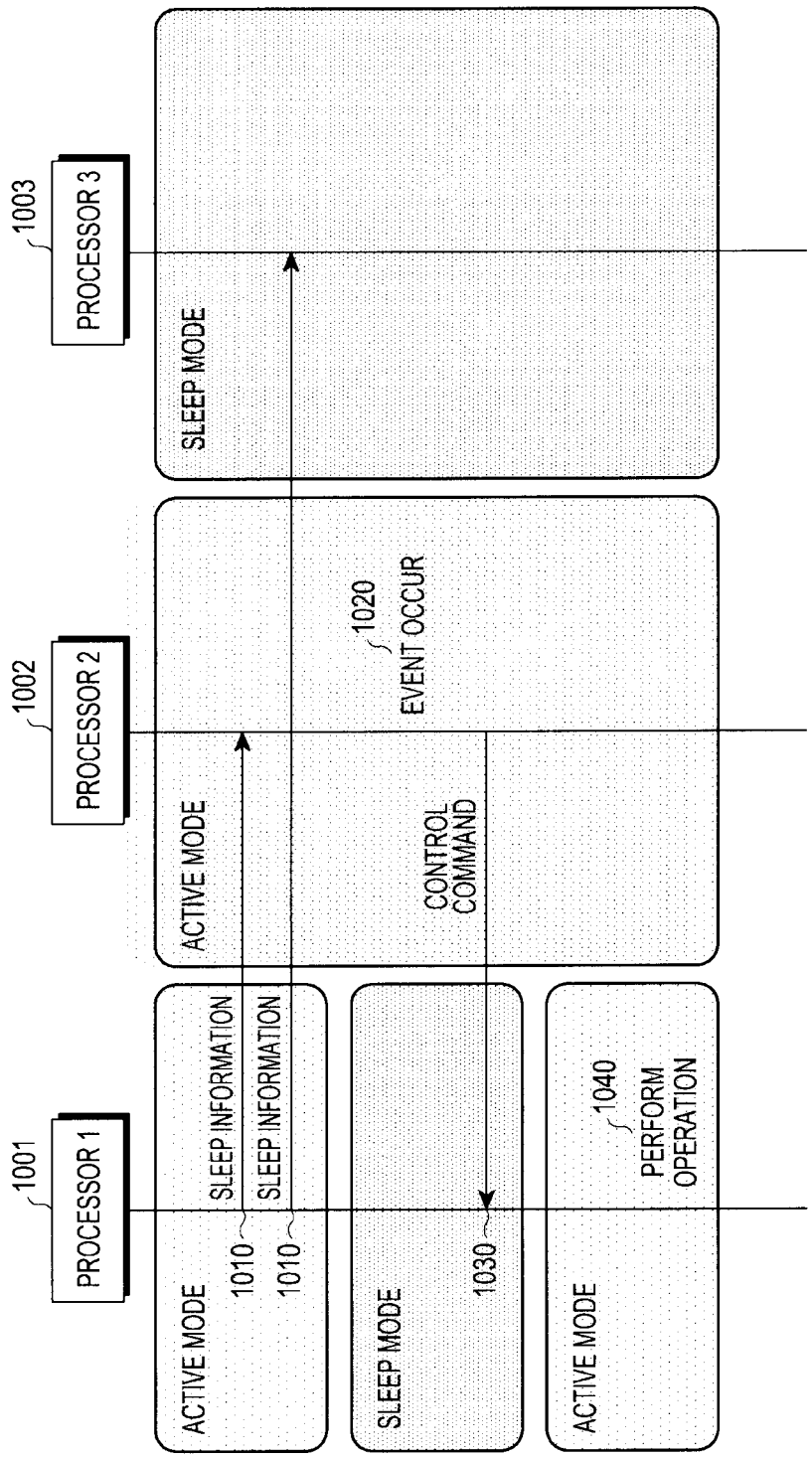
FIG. 10A is a sequence diagram of an example of a process, according to various embodiments of the present disclosure.

FIG. 10A is a sequence diagram of an example of a process, according to various embodiments of the present disclosure. According to the process, each of a plurality of processors (e.g., a first processor 1001, a second processor 1002 or a third processor 1003) of an electronic device (e.g., a wearable device) may communicate with the other processors in the plurality. Each of the plurality of processors may switch operation modes (e.g., the active mode or the sleep mode) independently of the rest.

In one embodiment, in operation 1010, if the first processor 1001 switches the operation mode from the active mode to the sleep mode, the first processor 1001 may provide sleep information related to the sleep mode to other processors (e.g., the second processor 1002 or the third processor 1003). For example, the sleep information may include an indication that the first processor 1001 is transitioning into the sleep mode. In one embodiment, the first processor 1001 may indicate the operation mode of the first processor 1001 by changing the state of a designated register. If the first processor 1001 is in the sleep mode, the second processor 1002 or the third processor 1003 may operate in the active mode to process events that occur when the first processor 1001 is in the sleep mode on behalf of the first processor 1001.

In one embodiment, in operation 1020, the second processor 1002 may detect environmental information through a sensor module, and may communicate with an external electronic device (e.g., smartphone) through the short-range communication module. The second processor 1002, for example, may receive a BLE packet for determining whether a short-range connection is established with an external device, and may receive a BT packet such as a message or a notification, from the external device. Upon receiving a BT packet from the external device, the second processor 1002 may select the first processor 1001 to perform an operation corresponding to the BT packet based on the header or profile information included in the BT packet.

The second processor 1002 may transmit to the first processor 1001 information indicating the operation corresponding to the BT packet, to the first processor 1001. In operation 1030, if the first processor 1001 is in the sleep mode, the second processor 1002 may cause the first processor 1001 to transition to the active mode. For example, the second processor 1002 may change the state of a register, and another module (e.g., the system control module 725) may provide a reset signal to the first processor 1001 in response to the state of the register being changed.

The first processor 1001 may then be switched from the sleep mode to the active mode by the reset signal in operation 1040, and in the active mode, the first processor 1001 may perform the operation related to the BT packet. For example, the first processor 1001 may display, on the display, the information (e.g., the sender, message and reception time of the BT packet) included in the BT packet, or other information (e.g., indication of an application for processing/displaying the BT packet) related to the BT packet.

Figure 10B:
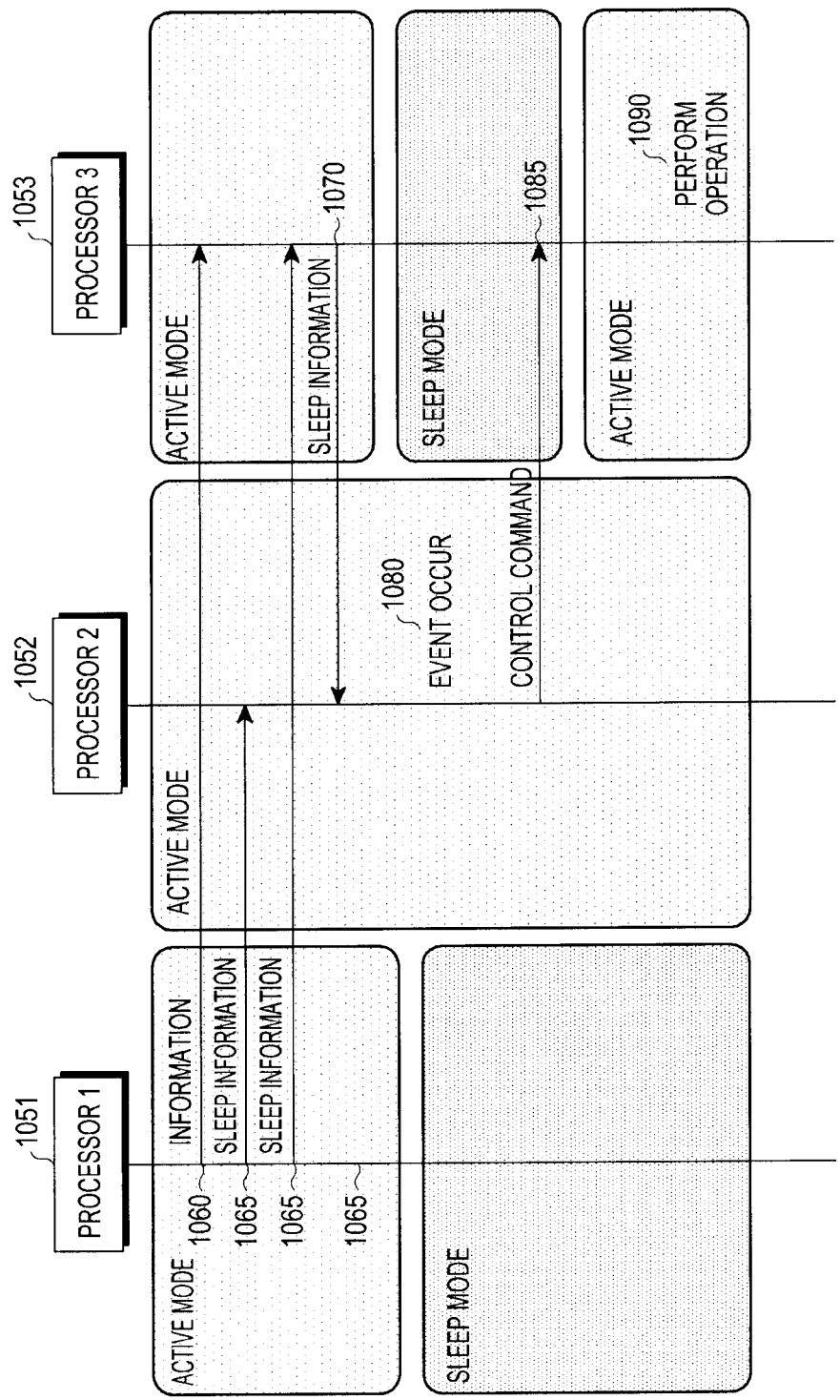
FIG. 10B is a sequence diagram of an example of a process, according to various embodiments of the present disclosure.

FIG. 10B is a sequence diagram of an example of a process, according to various embodiments. According to the process, each of a plurality of processors (e.g., a first processor 1051, a second processor 1052 or a third processor 1053) of an electronic device (e.g., a wearable device) may communicate with the other processors in the plurality. Each of the plurality of processors may switch operation modes (e.g., the active mode or the sleep mode) independently of the rest.

In one embodiment, the first processor 1051 may provide in advance the information that will be presented on the display of the electronic device. The information may be either generated internally by the electronic device or received from an external source. In operation 1060, the first processor 1051 may provide the information to the third processor 1053. For example, the first processor 1051 may store the information in a memory accessible by the third processor 1053. The first processor 1051 may further provide the second processor 1052 with an indication of an operation to be performed by the second processor when a particular event is detected. For example, the operation may include starting a timer.

In operation 1065, if the first processor 1051, which was operating in the active mode, switches to the sleep mode, the first processor 1051 may provide sleep information indicating that the first processor 1051 switches from the active mode to the sleep mode, to other processors (e.g., the second processor 1052 or the third processor 1053). In one embodiment, the first processor 1051 may indicate the operation mode of the first processor 1051 by changing the state of a designated register.

In one embodiment, in operation 1070, the third processor 1053 may switch to the sleep mode. For example, when the first processor 1051 and the third processor 1053 operate in the sleep mode, the second processor 1052 may operate in the active mode. In operation 1080, the second processor 1052 may detect a timer event that is generated by the timer when a predetermined time period elapses. In response to the event, the second processor 1052 may select the third processor 1053 to perform an operation related to the event. In operation 1085, the second processor 1052 may provide the third processor 1053 with an indication of the operation related to the event. In addition, the second processor 1052 may change the operation mode of the third processor 1053. For example, the second processor 1052 may change the state of a designated register, and a system control module may generate a reset in response to the state of the register being changed.

In operation 1090, the first processor 1051 is switched from the sleep mode to the active mode by the reset signal, and may perform the operation related to the event. For example, the first processor 1051 may display the information created in operation 1060, on the display. As discussed above with respect to FIG. 8, the first processor may display one of a plurality of pre-generated time screens (or time screen portions). In some implementations, the third processor 1053 may repeatedly display a subsequent pre-generated information item every time the event occurs. In some implementations, after operation 1090 is executed, the third processor 1053 may determine whether there are additional pre-generated information items (e.g., time screens) to be displayed upon subsequent occurrences of the event. If there are additional information items to be displayed, the third processor 1053 may transmit an indication to this effect to the second processor 1052. For example, if the information to be presented is left in the memory (e.g., the memory 840), the third processor 1053 may transmit to the second processor 1052 an instruction to reset the timer and start it again. If no pre-generated information items (e.g., time screens) are left in the memory, the third processor 1053 may transmit an indication to this effect to the first processor 1051 through the communication unit. For example, the third processor 1053 may transmit to the first processor 1051 an instruction to generate additional information items (e.g., time screens).

Figure 11:
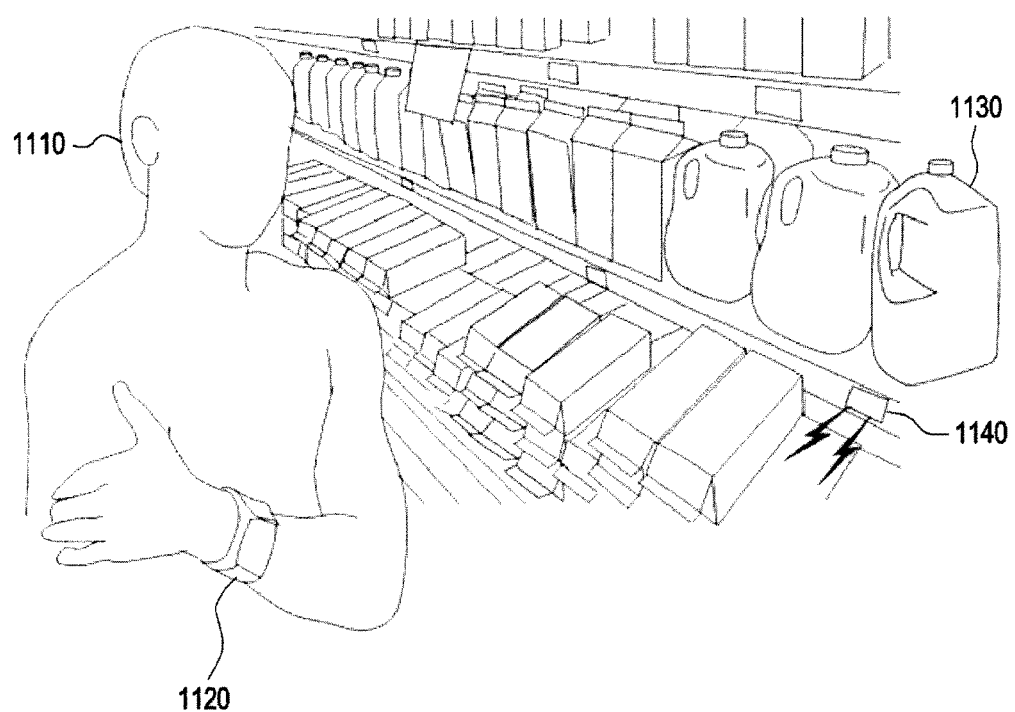
FIG. 11 is a diagram illustrating an example of the operation of an electronic device, according to various embodiments of the present disclosure.

FIG. 11 illustrates an example in which a user 1110 receives event-related information through an electronic device 1120, according to various embodiments of the present disclosure. The electronic device 1120 may be, for example, a wearable device or a mobile terminal that the user 1110 can readily hold or carry.

In one embodiment, the user 1110 may visit the shop that sells things (e.g., groceries or electronic devices), carrying or wearing the electronic device 1120. Before going to buy things, the user 1110 may store, in the electronic device 1120, a shopping list including the item 1130 that the user 1110 should buy. The shopping list may be indexed by a specific processor (e.g., the second processor 520) that is configured to consume relatively less power. For example, in a case where BLE is driven through a specific processor (e.g., the second processor 520) that is configured to consume relatively less power in the electronic device 1120, the shopping list may be activated through the specific processor (e.g., the second processor 520) that is configured to consume relatively less power, and even though the coupons or advertisements for the items that don't exist in the shopping list are received through BLE, the electronic device 1120 may be set not to provide the related information to the user 1110 by waking up a processor (e.g., the first processor 510) other than the specific processor. On the other hand, if the coupons or advertisements for the items existing in the shopping list are received or if the user 1110 is in proximity to the beaconing devices of the items, a processor (e.g., the first processor 510) other than the specific processor may be switched from the sleep mode to the active mode through the specific processor (e.g., the second processor 520) that is configured to consume relatively less power, thereby to give a notification to the user 1110 or to allow the user 1110 to perform a purchasing behavior.

The electronic device 1120 may drive BLE through a specific processor (e.g., the second processor 520) that is configured to consume relatively less power, among a plurality of processors. If execution of an operation other than the BLE is not required, a processor (e.g., the first processor 510) other than the specific processor may operate in the sleep mode, keeping the low-power state.

In one embodiment, if it is determined that the user 1110 has passed the shelf on which an item 1130 that is identified in the shopping list is placed (e.g., if the electronic device 1120 is away a predetermined distance or more from a beaconing device 1140 (e.g., BLE AP or WiFi AP)), without buying the item 1130, the electronic device 1120 may allow a specific processor (e.g., the second processor 520) that is configured to consume relatively less power, to determine through a BT profile that the item in the shopping list is away from the user 1110, and allow processors (e.g., the first processor 510) other than the specific processor to be switched from the sleep mode to the active mode, making it possible to output the notification indicating that the user 1110 has not bought the item registered in the shopping list, through at least one of display, sound or vibration.

In one embodiment, as the beaconing device (or a BLE point device) 1140 is installed in the store, advertisements related to the items included in the shopping list may be provided to the electronic device 1120 of the user 1110 through BLU communication. The related advertisements may be stored in a database or a specific list of the user through a specific processor (e.g., the second processor 520) that is configured to consume relatively less power, and through this, processors (e.g., the first processor 510) other than the specific processor are not required to manage the database or specific list in which the related advertisements are stored, and to generate a notification for each advertisement, so the battery life may be increased. Other processor (e.g., the first processor 510) other than the specific processor may be switched from the sleep mode to the active mode only if use of the other processor (e.g., the first processor 510) other than the specific processor, such as the display of the related advertisement or the payment behavior, is necessarily required. A related advertisement list may also be displayed at a time by other processor (e.g., the first processor 510) other than the specific processor at the time desired by the user or at the time the battery is sufficient. If the user 1110 selects the product that he/she wishes to buy, moves to the checkout counter, and presents the electronic device 1120, the store's cashier may check the customer information through the electronic device 1120, and request a payment for the product selected by the user 1110. Since the BLE communication or the simple display of product information or payment information is an operation that does not require relatively high power, a processor (e.g., the first processor 510) having relatively high power consumption among a plurality of processors of the electronic device may remain in the sleep mode, and a processor (e.g., the third processor 530) having relatively low power consumption may be configured to display a buy list or a payment request screen.

In one embodiment, a method for operating a plurality of processors may include detecting an event associated with an electronic device, at a first processor or a second processor; determining, at the second processor, whether to perform one or more operations for presenting information, based on the event; determining, at the second processor, a processor for performing the one or more operations among a plurality of processors including the first processor to a third processor, based on the determination; and delivering, at the second processor, a first command for performing the one or more operations to the determined processor.

In one embodiment, the detecting may include obtaining the information from an external electronic device; storing the information in an accessible memory; and obtaining, by the determined processor, the information by accessing the memory to perform the one or more operations based on the first command.

In one embodiment, the method may further include storing, by the first processor, data associated with the one or more operations in a memory; delivering a second command for creating the event to the second processor; and if the determined processor is the third processor, performing the one or more operations using the data based on the first command.

In one embodiment, the performing the one or more operations using the data may include notifying the second processor or the third processor through an interrupt channel that the one or more operations have been performed on a display.

In one embodiment, the delivering may include supplying power to the first processor if the determined processor is the first processor, and supplying power to the third processor if the determined processor is the third processor.

In one embodiment, the first processor or the second processor may include at least a part of a driving code of a short-range communication module.

In one embodiment, a storage device storing commands, in which the commands are set to allow at least one processor to perform at least one operation when the commands are executed by the at least one processor, and the at least one operation may include: detecting an event associated with an electronic device, at a first processor or a second processor; determining, at the second processor, whether to perform one or more operations for presenting information, based on the event; determining, at the second processor, a processor for changing an operation mode from among a plurality of processors including the first processor to a third processor, based on the determination; and transmitting, at the second processor, a command to the determined processor.

As is apparent from the foregoing description, an electronic device according to various embodiments of the present disclosure may drive some processors in the sleep mode, in the situation where operations of some processors among a plurality of processors are not required, thereby reducing the total power consumption of the electronic device. In one embodiment, while the first processor or the third processor is in the sleep mode, the second processor may determine based on an event which processor corresponds to an entity for performing an operation associated with the event, and change the operation mode of the processor. When the third processor operates in the active mode, the third processor may perform some functions (e.g., a function of obtaining data received by the first processor from an external device and processing the obtained data) of the first processor, without switching the operation mode of the first processor from the sleep mode to the active mode.

When the electronic device according to various embodiments of the present disclosure transmits and receives data through the short-range communication module by connecting the short-range communication module to the second processor, the second processor may process the data received or to be transmitted, without switching the first process from the sleep mode to the active mode while the first processor is in the sleep mode.

FIGS. 1-11 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. As used throughout the disclosure, the term "processor" may refer to any suitable type of processing circuitry. For example, the term processor may refer to one or more of a single processing core, multiple processing cores, one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. As used throughout the disclosure, the term "memory" may refer to non-volatile memory, volatile memory, remote memory (e.g., network-accessible storage), and/or any combination thereof. Accordingly, a given "memory region" may be located in a single storage device or span multiple storage devices.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software that is loaded into hardware or a combination of both and may be performed in whole or in part within the programmed instructions of a computer. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller/control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and the broadest reasonable interpretation do not constitute software per se. For example, the processors in the present disclosure comprise hardware and none of Applicant's appended claim elements are pure software or software per se.

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a first processing module configured to include a first processor and a third processor, and execute a first operating system;
   a second processing module configured to include a lower power second processor, wherein the lower power second processor uses lower power than the first and third processor and the third processor has lower power consumption than the first processor, the lower power second processor configured to execute a second operating system and connected to a short-range communication interface; and
   a power management module connected to the first processing module and the second processing module,
   wherein the lower power second processor is configured to:
   when the first processing module is in a sleep mode, detect a receipt of data via the short-range communication interface;
   select one of the first and third processors to perform one or more operations associated with the received data based on required power associated with the performing of the one or more operations, thereby resulting in a selected processor; and
   transmit, to the power management module, a signal to change an operation mode of the selected processor to cause the selected processor to perform the one or more operations,
   wherein the selecting of the one of the first and third processors to perform the one or more operations comprises:
   receiving a predetermined time period from the first processor prior to the first processor entering sleep mode; and
   selecting the third processor when the predetermined time period is still pending.

2. The electronic device of claim 1, wherein the first processor, the lower power second processor and the third processor are integrated on a single chip.

3. The electronic device of claim 1, wherein the power management module is configured to control the selected processor to perform the one or more operations including generating the signal to changes the operation mode of the selected processor.

4. The electronic device of claim 1, wherein the first processing module is configured to execute the first operating system, and the second processing module is configured to execute the second operating system.

5. The electronic device of claim 4, further comprising a memory having a first memory region and a second memory region, wherein:
   the first processor is configured to boot the first operating system in the first memory region, retrieve a boot code for the second operating system from the first memory region, and store the boot code in the second memory region; and
   wherein the lower power second processor is configured to retrieve the boot code from the second memory region, and use the boot code to boot the second operating system in the second memory region.

6. The electronic device of claim 5, wherein the first processor is granted access to at least a portion of the first memory region, and the lower power second processor is denied access to the first memory region.

7. The electronic device of claim 5, wherein the second memory region includes a data portion, and the first processor is denied access to the data portion, while being granted access to a remaining portion of the second memory region.

8. The electronic device of claim 5, wherein:
   the lower power second processor is configured to store information in the second memory region indicating the one or more operations, and provide a location of the second memory region to the selected processor; and
   the selected processor is configured to retrieve the information from the second memory region, and perform the one or more operations based on the information.

9. The electronic device of claim 8, wherein causing the selected processor to perform the one or more operations includes transitioning the selected processor from a sleep mode to an active mode if the selected processor is in the sleep mode when the data is received.

10. The electronic device of claim 1, wherein:
    the selected processor is the third processor;
    the first processor is configured to store information on the one or more operations in a memory region accessible by the third processor; and
    the third processor is configured to retrieve the information from the memory region and perform the one or more operations based on the information.

11. The electronic device of claim 1, further comprising a memory storing a first product information item, wherein:
    the third processor is selected to perform the one or more operations when an event is generated in response to a receipt of a beacon signal including a second product information item that matches the first product information item.

12. A method for operating an electronic device having a first processor, a second processor, a third processor and a power management module, the second processor comprising a sub-processor, the method comprising:
    when a first processing module including the first processor and the third processor is in a sleep mode, detecting, by the sub-processor, receipt of data via a short-range communication interface connected to a second processing module including the sub-processor;
    selecting, by the sub-processor, one of the first processor and the third processor to perform one or more operations associated with the received data based on header or profile information in a Bluetooth (BT) packet; and
    transmitting, by the sub-processor, a signal to change an operation mode of the selected processor to cause the selected processor to perform the one or more operations, to the power management module connected to the first processing module and the second processing module,
    wherein the selecting of the one of the first and third processors to perform the one or more operations comprises:

receiving a predetermined time period from the first processor prior to the first processor entering sleep mode; and selecting the third processor when the predetermined time period is still pending.

13. The method of claim 12, further comprising:

when the sub-processor stores information indicating the one or more operations in a memory region that is accessible by the selected processor, providing, by the sub-processor to the selected one of the first processor and the third processor, a location of the memory region where the information is stored;

retrieving, by the selected processor, the information from the memory region; and performing, by the selected processor, the one or more operations based on the information.

14. The method of claim 12, wherein the selected processor is the third processor, the method further comprising:

when the first processor stores information associated with the one or more operations in a memory region accessible by the third processor, retrieving, by the third processor, the information from the memory region; and performing, by the third processor, the one or more operations based on the information.

15. The method of claim 14, wherein performing the one or more operations includes outputting information on a display.

16. The method of claim 12, wherein causing the selected processor to perform the one or more operations includes resuming a supply of power to the selected processor.

17. The method of claim 12, wherein at least one of the first processor or the sub-processor executes a driver for the short-range communication interface.

18. A non-transitory computer readable medium storing processor executable instructions which when executed by an electronic device having a first processor, a second processor, a third processor and a power management module, the second processor comprising a sensor hub processor, cause the electronic device to execute a method comprising:

when a first processing module including the first processor and the third processor is in a sleep mode, receiving, by the sensor hub processor, data via a short-range communication interface connected to a second processing module including the sensor hub processor;

selecting, by the sensor hub processor, one of the first processor and the third processor to perform a one or more operations with the received data based on required power associated with the performing of the one or more operations; and transmitting, by the sensor hub processor, a signal to change an operation mode of the selected processor to cause the selected processor to perform the one or more operations, to the power management module connected to the first processing module and the second processing module, wherein the selecting of the one of the first and third processors to perform the one or more operations comprises:

receiving a predetermined time period from the first processor prior to the first processor entering sleep mode; and selecting the third processor when the predetermined time period is still pending.

\* \* \* \* \*